(12) United States Patent
Nanba et al.

(10) Patent No.: US 7,035,023 B2
(45) Date of Patent: Apr. 25, 2006

(54) LENS SYSTEM

(75) Inventors: Norihiro Nanba, Tochigi (JP); Daisuke Ito, Tochigi (JP); Makoto Sekita, Kanagawa (JP); Toshitaka Higuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 10/829,058

(22) Filed: Apr. 21, 2004

(65) Prior Publication Data

US 2004/0212901 A1    Oct. 28, 2004

(30) Foreign Application Priority Data

Apr. 24, 2003  (JP) .............................. 2003-119354
Dec. 26, 2003  (JP) .............................. 2003-434281

(51) Int. Cl.
*G02B 9/14* (2006.01)

(52) U.S. Cl. .................. 359/785; 359/781; 359/795

(58) Field of Classification Search ............... 359/646, 359/645, 661, 716, 717, 735, 736, 781, 785, 359/793, 795, 797, 739
See application file for complete search history.

(56) References Cited

U.S. PATENT DOCUMENTS

| | | | | |
|---|---|---|---|---|
| 2,445,594 A * | 7/1948 | Bennett | ..................... | 359/663 |
| 3,359,057 A * | 12/1967 | Ackroyd | ..................... | 359/739 |
| 4,163,604 A | 8/1979 | Betensky | | |
| 4,620,775 A * | 11/1986 | Fujioka | ..................... | 359/739 |
| 5,274,456 A | 12/1993 | Izumi et al. | | |
| 5,329,403 A | 7/1994 | Fukasawa | | |
| 5,596,452 A | 1/1997 | Yamakawa | | |
| 5,596,455 A * | 1/1997 | Eckhardt | ..................... | 359/789 |
| 5,966,251 A * | 10/1999 | Nagahara | ..................... | 359/773 |
| 6,441,971 B1 | 8/2002 | Ning | | |
| 6,466,377 B1 | 10/2002 | Saito et al. | | |
| 6,476,982 B1 * | 11/2002 | Kawakami | ..................... | 359/791 |
| 6,560,048 B1 | 5/2003 | Okamori et al. | | |
| 6,728,047 B1 * | 4/2004 | Sato et al. | ..................... | 359/786 |
| 6,813,100 B1 * | 11/2004 | Yamaguchi et al. | ......... | 359/793 |
| 2003/0081330 A1 | 5/2003 | Do et al. | | |
| 2004/0150893 A1 * | 8/2004 | Shinohara | ..................... | 359/785 |
| 2004/0257678 A1 * | 12/2004 | Kim et al. | ..................... | 359/795 |
| 2005/0002116 A1 * | 1/2005 | Nakamura | ..................... | 359/716 |

FOREIGN PATENT DOCUMENTS

| | | |
|---|---|---|
| EP | 0467240 | 1/1992 |
| JP | H44-21105 | 9/1969 |
| JP | H53-36226 | 4/1978 |
| JP | H61-77816 | 4/1986 |
| JP | H1-144007 | 6/1989 |
| JP | 1175372 | 7/1989 |
| JP | H4-158612 | 6/1992 |
| JP | 4234013 | 8/1992 |

(Continued)

*Primary Examiner*—Scott J. Sugarman
*Assistant Examiner*—Darryl J. Collins
(74) *Attorney, Agent, or Firm*—Morgan & Finnegan, LLP

(57) ABSTRACT

This application discloses a lens system comprising in order from an object side to an image side: an aperture stop; a first lens element, having a positive optical power; and a second lens element, having a negative optical power. By setting the shapes of the respective lens elements and the materials making up the respective lens elements so as to meet predetermined conditions in such a lens system, a lens system of a compact size which provides good optical performance is realized while securing telecentric characteristics.

23 Claims, 29 Drawing Sheets

FOREIGN PATENT DOCUMENTS

| | | |
|---|---|---|
| JP | H5-188 | 1/1993 |
| JP | H9-288235 | 11/1997 |
| JP | 2001083409 | 3/2001 |
| JP | 2002221659 | 8/2001 |
| JP | 2002228922 | 8/2002 |
| JP | 2002244030 | 8/2002 |
| JP | 2002258155 | 9/2002 |
| JP | 2002278940 | 9/2002 |
| JP | 2002365529 | 12/2002 |
| JP | 2002365531 | 12/2002 |

* cited by examiner

| SPHERICAL ABERRATION | ASTIGMATISM | DISTORTION (%) | CHROMATIC ABERRATION OF MAGNIFICATION (g line) |

| SPHERICAL ABERRATION | ASTIGMATISM | DISTORTION (%) | CHROMATIC ABERRATION OF MAGNIFICATION (g line) |

SPHERICAL
ABERRATION

ASTIGMATISM

DISTORTION
(%)

CHROMATIC
ABERRATION OF
MAGNIFICATION
(g line)

| SPHERICAL ABERRATION | ASTIGMATISM | DISTORTION (%) | CHROMATIC ABERRATION OF MAGNIFICATION (g line) |

SPHERICAL ABERRATION    ASTIGMATISM    DISTORTION (%)    CHROMATIC ABERRATION OF MAGNIFICATION (g line)

SPHERICAL ABERRATION | ASTIGMATISM | DISTORTION (%) | CHROMATIC ABERRATION OF MAGNIFICATION (g line)

SPHERICAL ABERRATION

ASTIGMATISM

DISTORTION (%)

CHROMATIC ABERRATION OF MAGNIFICATION (g line)

| SPHERICAL ABERRATION | ASTIGMATISM | DISTORTION (%) | CHROMATIC ABERRATION OF MAGNIFICATION (g line) |

| SPHERICAL ABERRATION | ASTIGMATISM | DISTORTION (%) | CHROMATIC ABERRATION OF MAGNIFICATION (g line) |

LENS SYSTEM

BACKGROUND OF THE INVENTION

1. Field of the Invention

This invention relates to a lens system preferable for use in an image taking lens (image taking optical system) of a video camera, digital camera, or mobile phone and mobile terminal with camera, etc.

2. Description of the Related Art

Various video cameras, digital cameras, and mobile phones and mobile terminals with camera, which are equipped with a CCD sensor, CMOS sensor, or other solid-state image pickup element, have been developed in recent years. Compact, lightweight image taking lenses are strongly desired, especially with mobile telephones and mobile terminals from the standpoint of portability.

There are known compact image taking lenses with a two-lens arrangement, having a first lens with a positive refractive power and a second lens with a negative refractive power (for example, see Patent Documents 1 and 2).

There are also known image taking lenses with a so-called triplet arrangement, in which the improvement of the image forming performance is taken into consideration along with a compact size and having a first lens with a positive refractive power, a second lens with a negative refractive power, and a third lens with a positive refractive power (for example, see Patent Documents 3 to 8).

Among triplet arrangements, there are also known image taking lenses of a so-called front stop arrangement, having an aperture stop positioned at the most object side and being a comparatively advantageous arrangement for reduction of the front lens diameter and elongation of the exit pupil (for example, see Patent Documents 9 to 17).

There are also arrangements, which though not being image taking lenses, employ a triplet arrangement with an aim at realizing a compact size (for example, see Patent Documents 18 and 19).

Also, as front stop type systems which are developed types of the triple arrangement, there are known image taking lenses which are arranged from four lenses (for example, see Patent Documents 20 to 22).

[Patent Document 1]
Japanese Patent Laid-Open No. 2002-258155 (corresponding to U.S. Pat. No. AA2003081330)

[Patent Document 2]
U.S. Pat. No. 5,329,403

[Patent Document 3]
Japanese Patent Laid-Open No. 2001-83409 (corresponding to U.S. Pat. No. 6,560,043)

[Patent Document 4]
Japanese Patent Laid-Open No. 2002-221659 (corresponding to none presently as of Mar. 11, 2004)

[Patent Document 5]
Japanese Patent Laid-Open No. 2002-244030 (corresponding to none presently as of Mar. 11, 2004)

[Patent Document 6]
Japanese Patent No. 2,683,463 (corresponding to EP B1 467240)

[Patent Document 7]
Japanese Patent No. 2,742,581 (corresponding to U.S. Pat. No. 5,274,456)

[Patent Document 8]
U.S. Pat. No. 5,596,455

[Patent Document 9]
Japanese Utility Model No. S44(1969)-21105

[Patent Document 10]
Japanese Patent Laid-Open No. S53(1978)-36226

[Patent Document 11]
Japanese Patent Laid-Open No. S61(1986)-77816

[Patent Document 12]
Japanese Patent Laid-Open No. H1(1989)-144007 (corresponding to none presently as of Mar. 11, 2004)

[Patent Document 13]
Japanese Patent Laid-Open No. H4(1992)-153612 (corresponding to none presently as of Mar. 11, 2004)

[Patent Document 14]
Japanese Patent Laid-Open No. H5(1993)-188284 (corresponding to none presently as of Mar. 11, 2004)

[Patent Document 15]
Japanese Patent Laid-Open No. H9(1997)-288235 (corresponding to none presently as of Mar. 11, 2004)

[Patent Document 16]
Japanese Patent Laid-Open No. 2001-75006 (corresponding to U.S. Pat. No. 6,466,377)

[Patent Document 17]
U.S. Pat. No. 6,441,971

[Patent Document 18]
U.S. Pat. No. 4,163,604

[Patent Document 19]
U.S. Pat. No. 5,596,452

[Patent Document 20]
Japanese Patent Laid-Open No. 2002-228922 (corresponding to U.S. Pat. No. 6,476,982)

[Patent Document 21]
Japanese Patent Laid-Open No. 2002-365529 (corresponding to none presently as of Mar. 11, 2004)

[Patent Document 22]
Japanese Patent Laid-Open No. 2002-365531 (corresponding to none presently as of Mar. 11, 2004)

With the system disclosed in Japanese Patent Laid-Open No. 2002-258155, a negative lens of a two-lens arrangement has a shape with which a comparatively strongly concave surface is faced towards the image side, the exit pupil distance tends to be short, and the occurrence of shading becomes an issue in the case where a solid-state image pickup element is used.

With the system disclosed in U.S. Pat. No. 5,329,403, the interval between a positive lens and a negative lens of a two-lens arrangement is large, making a compact size difficult to realize.

The lens system of Japanese Patent Laid-Open No. 2001-83409 is of a middle stop type, with which an aperture stop is positioned inside the lens system. Thus in comparison to a front stop type system, a long back focus must be secured in order to set a long exit pupil distance and reduction of the total lens length is difficult. The same can be for the lens systems of Japanese Patent Laid-Open No. 2002-221659 and Japanese Patent Laid-Open No. 2002-244030.

Also in terms of manufacturing cost, it is more effective to use lenses formed of plastic material than lenses formed of glass material. With the lens systems of Japanese Patent No. 2,683,463, U.S. Pat. No. 5,596,455, Japanese Utility Model No. S44(1969)-21105, Japanese Patent Laid-Open No. S53(1978)-36226, Japanese Patent Laid-Open No. S61 (1986)-77816, Japanese Patent Laid-Open No. H1(1989)-144007, Japanese Patent Laid-Open No. H4(1992)-153612, and Japanese Patent Laid-Open No. H5(1993)-188284, though the number of component lenses is three and thus few, since all lenses are formed of glass material, the manufacturing cost tends to be high.

With lenses formed of plastic material, shape variations due to temperature and humidity variations tend to occur more readily in comparison to lenses formed of glass material, and focus variation and aberration variations due to environmental variations tend to be a problem. This becomes especially significant when the refractive power of a lens is made high.

With the three-lens arrangements of Japanese Patent No. 2,742,581 and Japanese Patent Laid-Open No. 2001-75006, though all lenses are formed of plastic material to facilitate manufacture, since lenses of strong refractive power are used in part, focus variation and aberration variations due to environmental variations tend to occur.

Though Japanese Patent Laid-Open No. 2002-228922 discloses a lens system using two lenses formed of glass material and two lenses formed of plastic material, the number of lenses is four and thus high, and the reduction of the total lens length is difficult. The same applies to Japanese Patent Laid-Open No. 2002-365529 and Japanese Patent Laid-Open No. 2002-365531.

Also, in the case of a positive-negative-positive, three-lens arrangement, a front stop type arrangement, with which an aperture stop is most separated from an image pickup element, is advantageous for reducing the front lens diameter to achieve a compact size and for providing good telecentric characteristics at the image side. With a front stop type, though a shape which is concentric with respect to the aperture stop is preferable for obtaining good optical performance while achieve reduction of the total length, with the conventional examples, the shapes of the respective lenses were not concentric with respect to the aperture stop or even if they were concentric, they were hardly optimal in terms of shape.

SUMMARY OF THE INVENTION

This invention has been made in view of the above problems of conventional lens systems and an object thereof is to provide a lens system of a compact size which provides good optical performance while adequately securing the required telecentric characteristics.

An exemplary mode of a lens system by the present invention comprises in order from an object side to an image side: an aperture stop; a first lens element with a positive optical power; and a second lens element with a negative optical power. By setting the shapes of the respective lens elements and the materials making up the respective lens elements so as to meet predetermined conditions in such a lens system, of a compact size which provides good optical performance is realized while securing the desired telecentric characteristics.

DETAILED DESCRIPTION OF THE PREFERRED EMBODIMENTS

Embodiments of the present invention's lens system shall now be described with reference to the drawings.

(Embodiment 1)

FIGS. 1, 3, 5, 7, 9, 11, 13, 15, 17, 19, 21, 23, 25, 27, 29, 31, 33, 35, 37, 39, 41, 43, and 45 are respectively sectional views of lens systems of Numerical Examples 1 to 23 to be described below. FIGS. 2, 4, 6, 8, 10, 12, 14, 16, 18, 20, 22, 24, 26, 28, 30, 32, 34, 36, 38, 40, 42, 44, and 46 respectively show aberration diagrams of Numerical Examples 1 to 23. In the following, Numerical Examples 1 to 23 shall be referred to collectively as "Embodiment 1". A lens system of Embodiment 1 is applied to an image taking lens of a digital camera or a mobile phone or mobile terminal with camera, etc.

In the respective sectional views of Embodiment 1, L1 indicates a first lens of positive refractive power, L2 indicates a second lens of negative refractive power, L3 indicates a third lens of positive refractive power, L4 indicates a fourth lens of positive or negative refractive power, and SP indicates an aperture stop. IM indicates an image plane at which the photosensitive surface of a solid-state image pickup element (photoelectric conversion element), such as a CCD sensor, CMOS sensor, etc., is positioned. G is a glass block which is provided in terms of design in correspondence to a quartz low-pass filter or an infrared cut filter, etc.

In the respective aberration diagrams, d indicates the d line, g indicates the g line, ΔM indicates the meridional image plane, and ΔS indicates the sagittal image plane.

Figure 1:
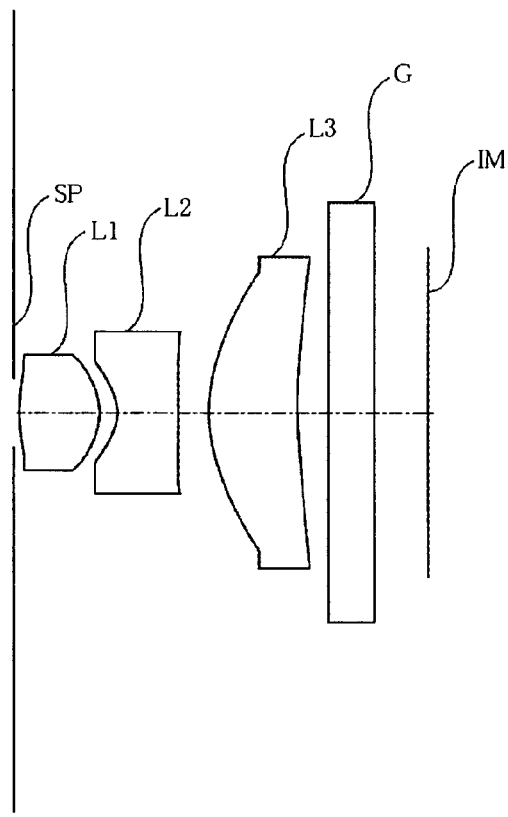
FIG. 1 is a sectional view of a lens system of Numerical Example 1.
Figure 2:
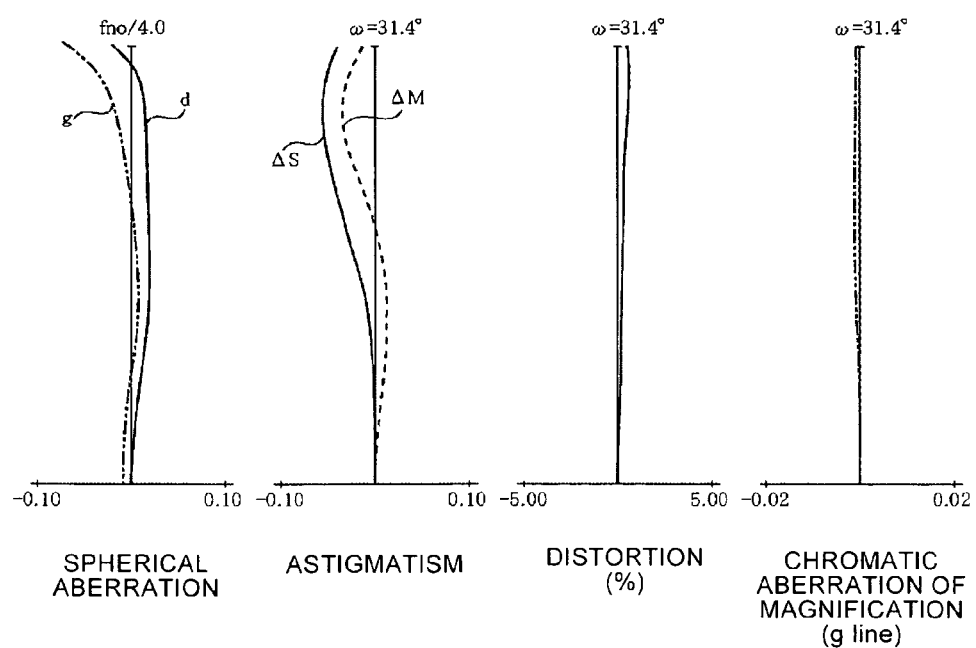
FIG. 2 shows aberration diagrams of the lens system of Numerical Example 1.
Figure 3:
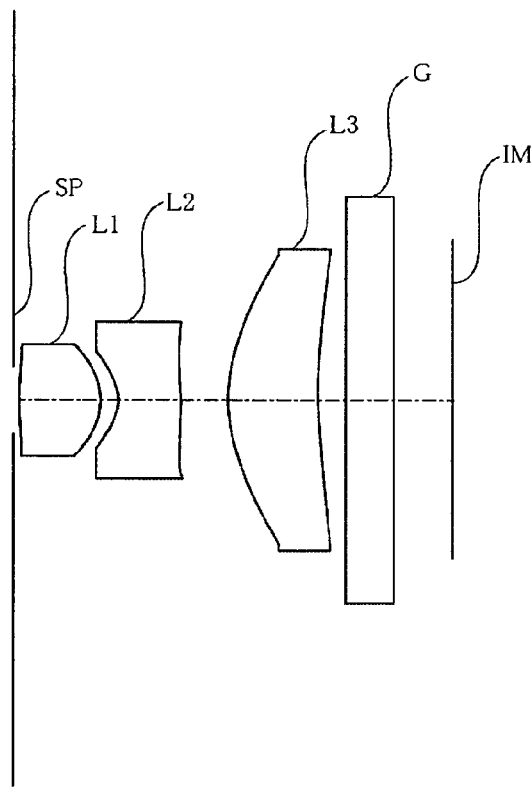
FIG. 3 is a sectional view of a lens system of Numerical Example 2.
Figure 4:
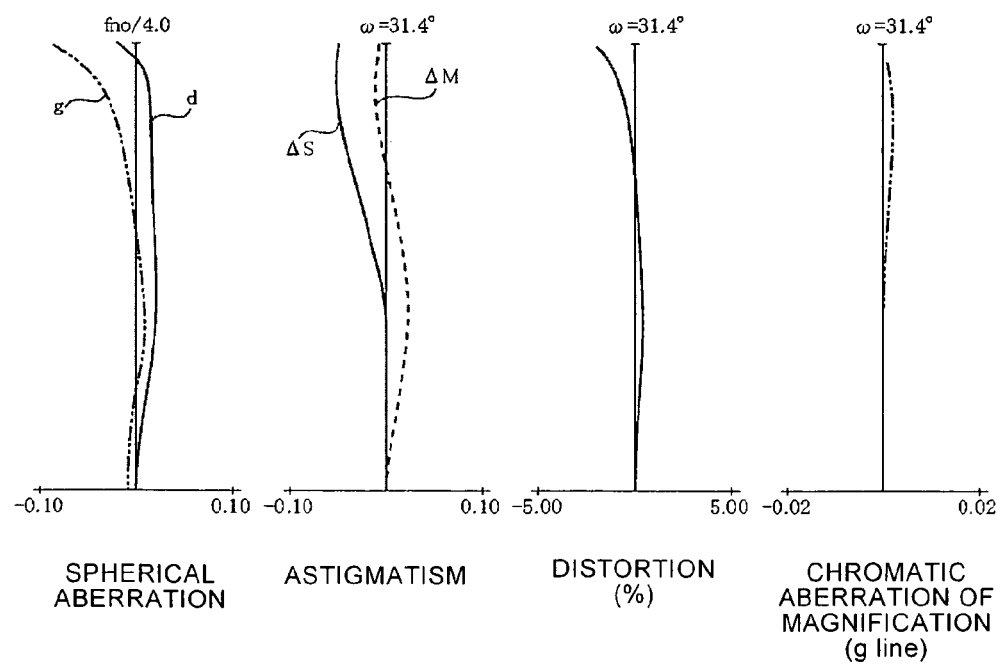
FIG. 4 shows aberration diagrams of the lens system of Numerical Example 2.
Figure 5:
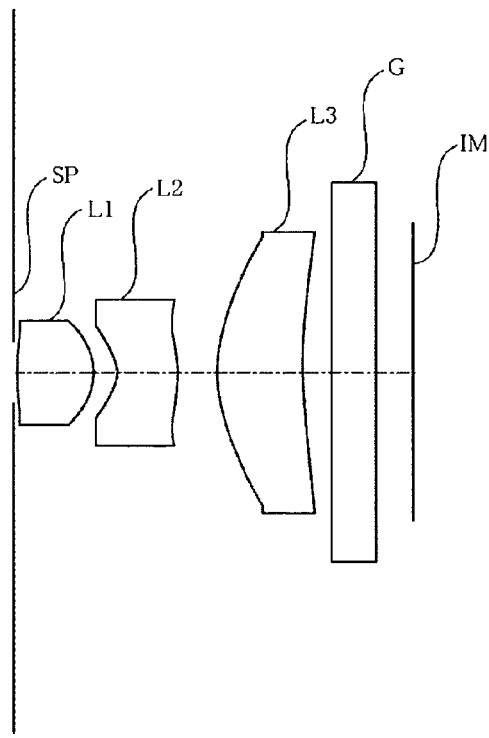
FIG. 5 is a sectional view of a lens system of Numerical Example 3.
Figure 6:
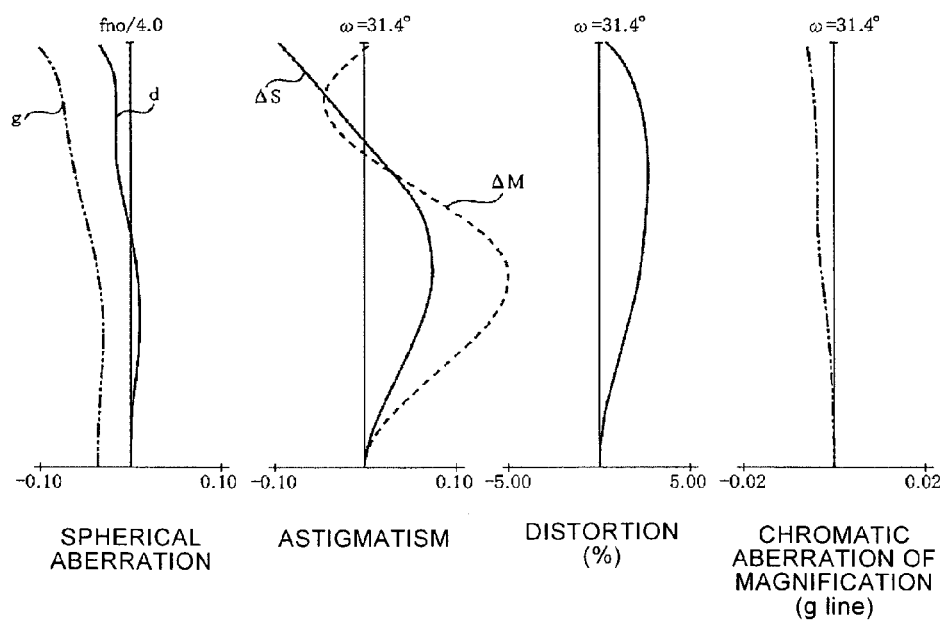
FIG. 6 shows aberration diagrams of the lens system of Numerical Example 3.
Figure 7:
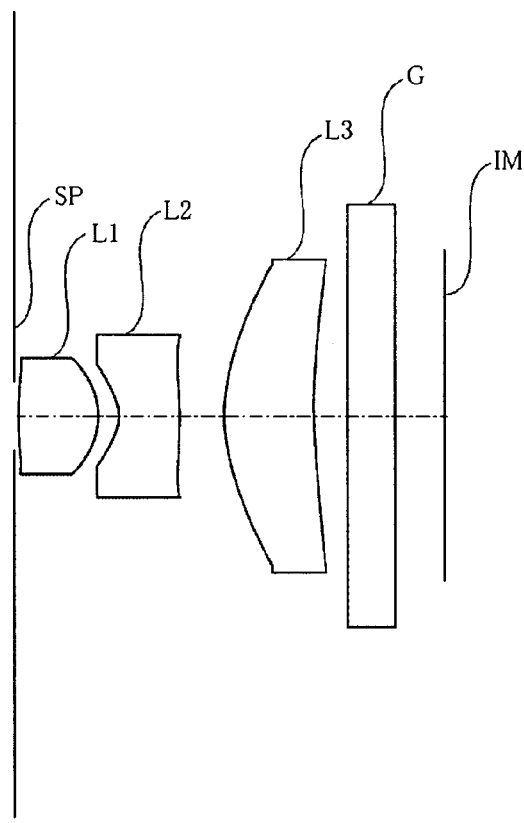
FIG. 7 is a sectional view of a lens system of Numerical Example 4.
Figure 8:
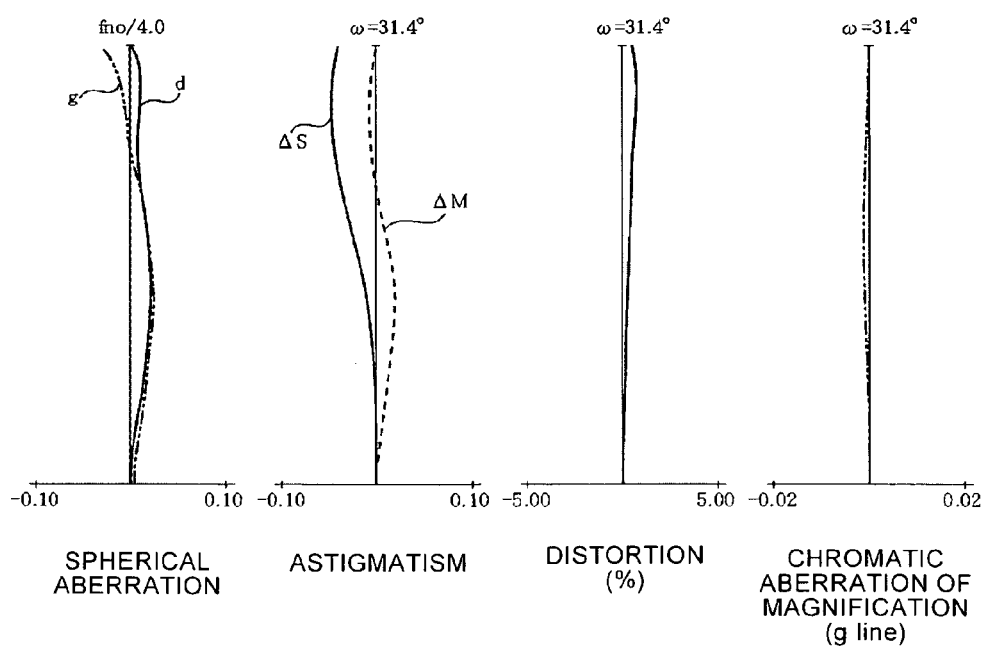
FIG. 8 shows aberration diagrams of the lens system of Numerical Example 4.
Figure 9:
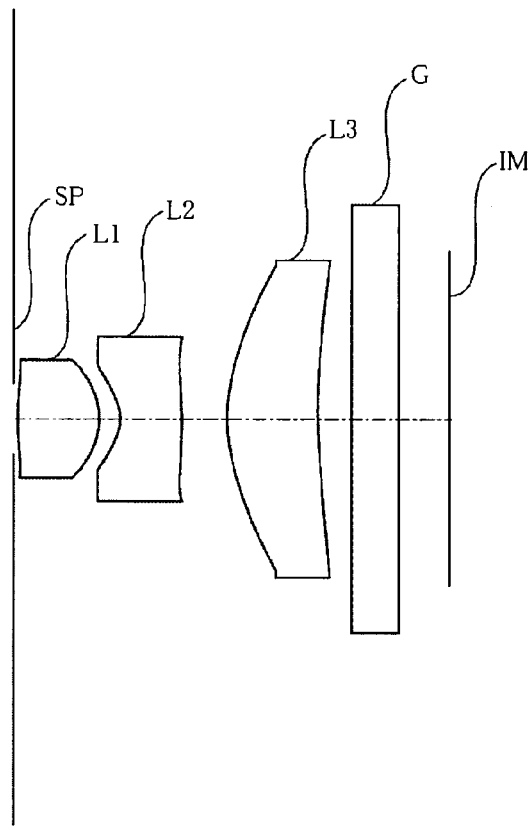
FIG. 9 is a sectional view of a lens system of Numerical Example 5.
Figure 10:
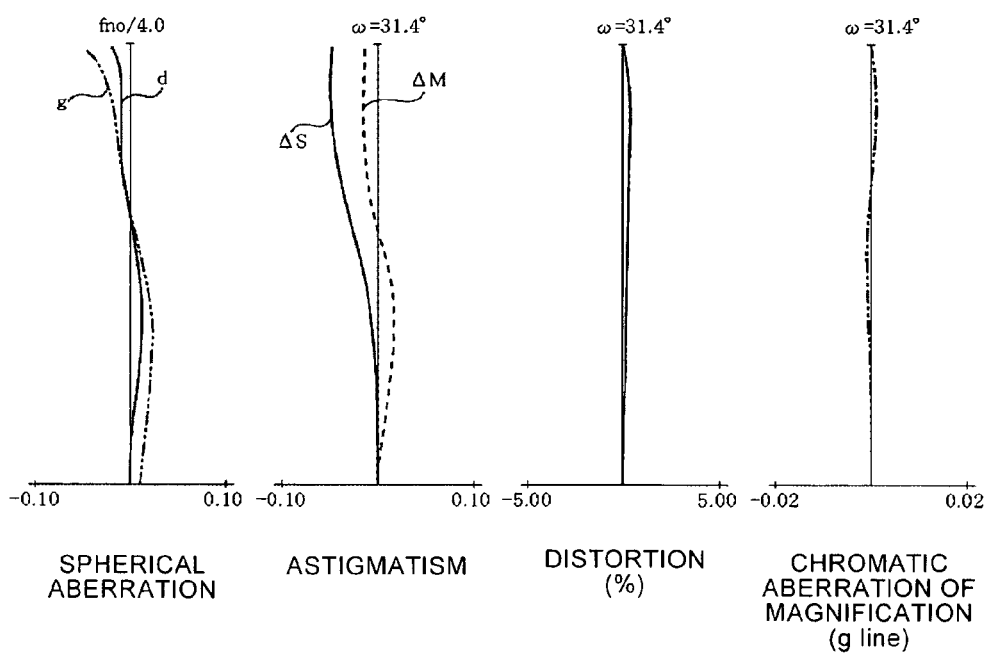
FIG. 10 shows aberration diagrams of the lens system of Numerical Example 5.
Figure 11:
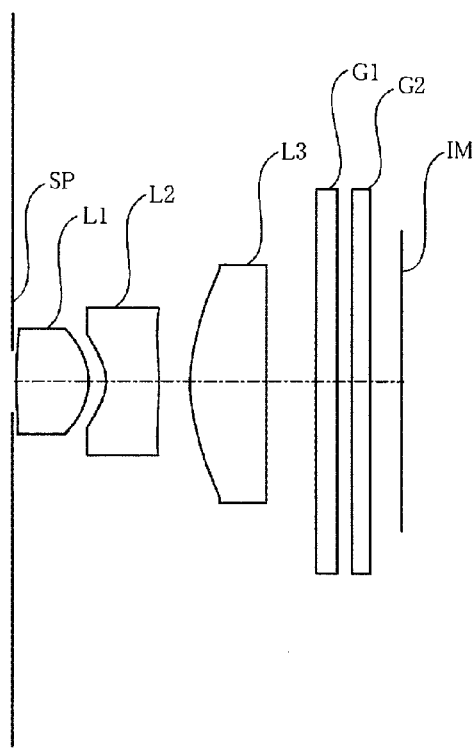
FIG. 11 is a sectional view of a lens system of Numerical Example 6.
Figure 12:
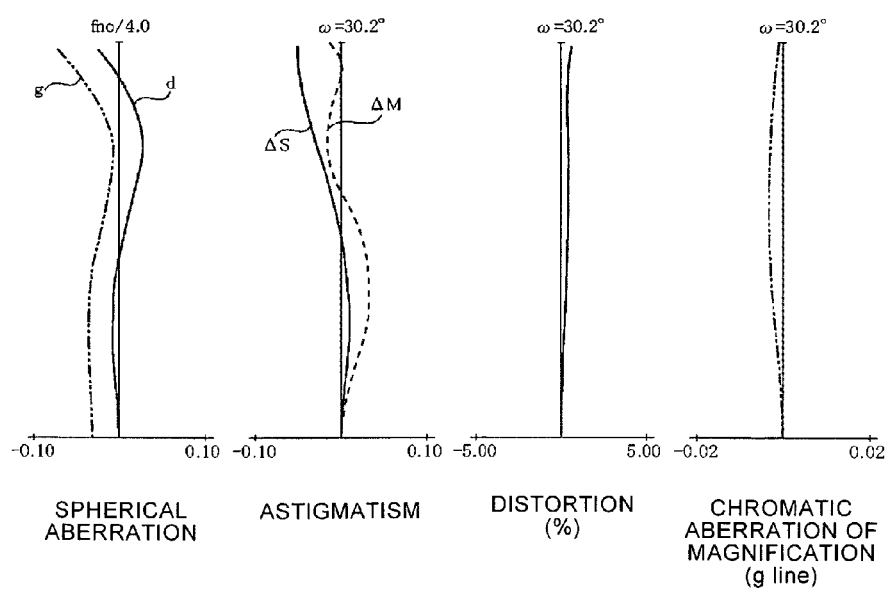
FIG. 12 shows aberration diagrams of the lens system of Numerical Example 6.
Figure 13:
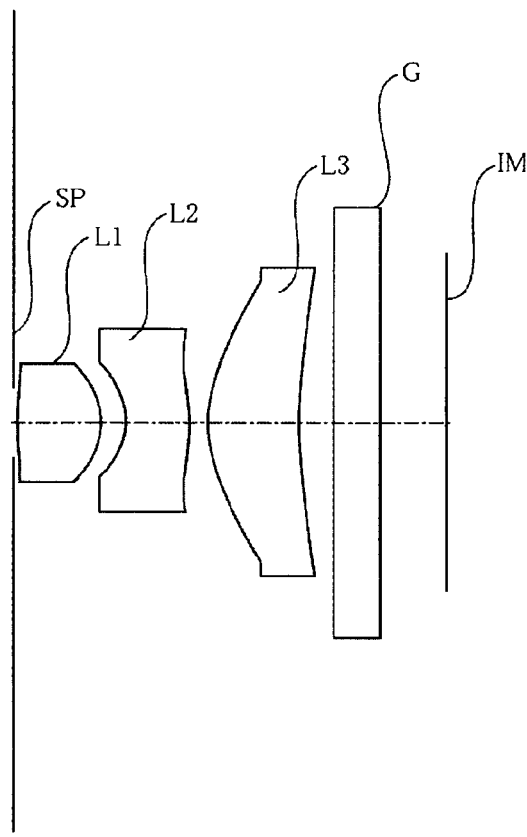
FIG. 13 is a sectional view of a lens system of Numerical Example 7.
Figure 14:
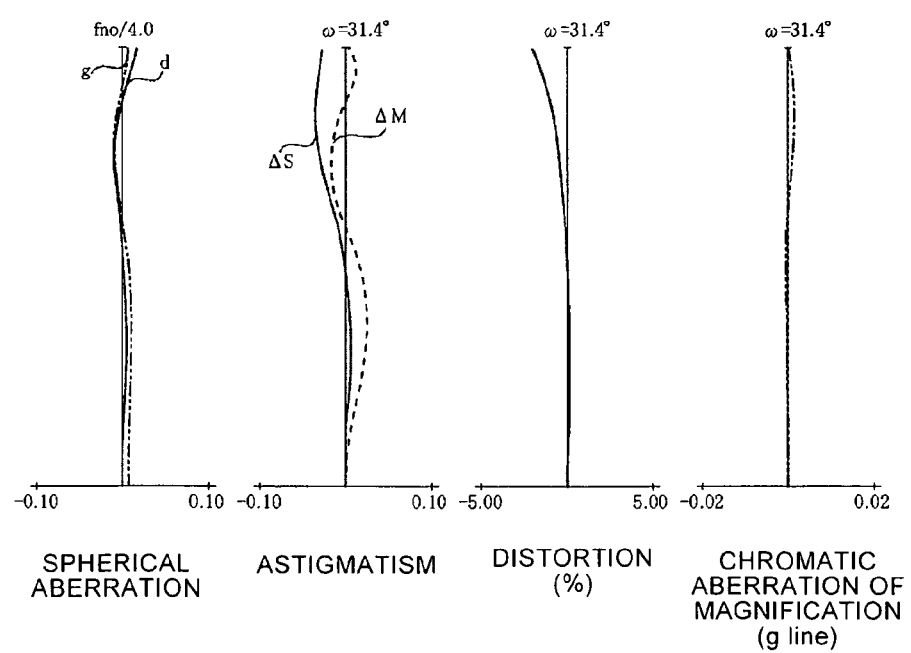
FIG. 14 shows aberration diagrams of the lens system of Numerical Example 7.
Figure 15:
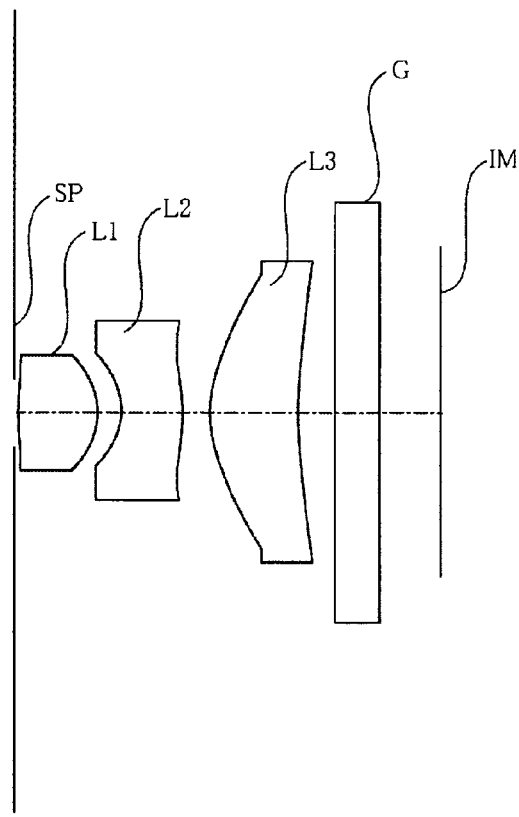
FIG. 15 is a sectional view of a lens system of Numerical Example 8.
Figure 16:
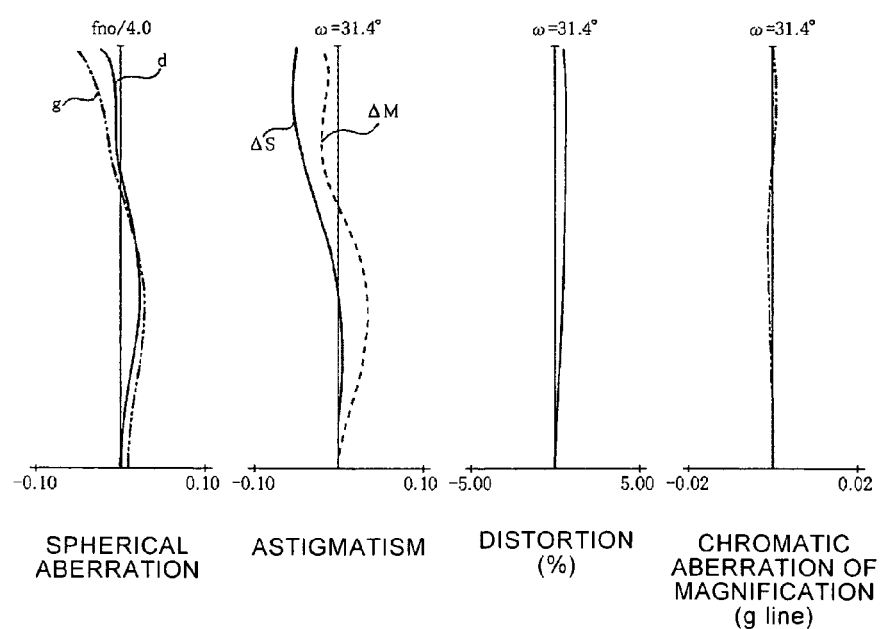
FIG. 16 shows aberration diagrams of the lens system of Numerical Example 8.
Figure 17:
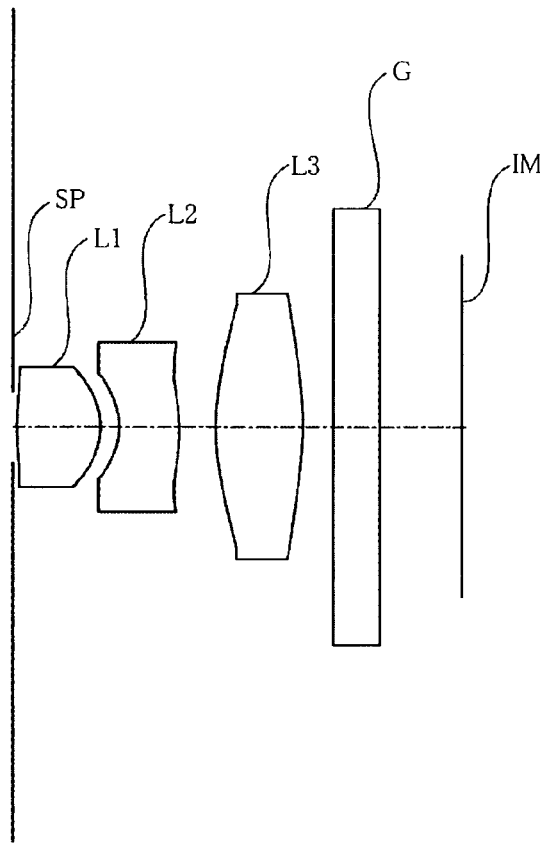
FIG. 17 is a sectional view of a lens system of Numerical Example 9.
Figure 18:
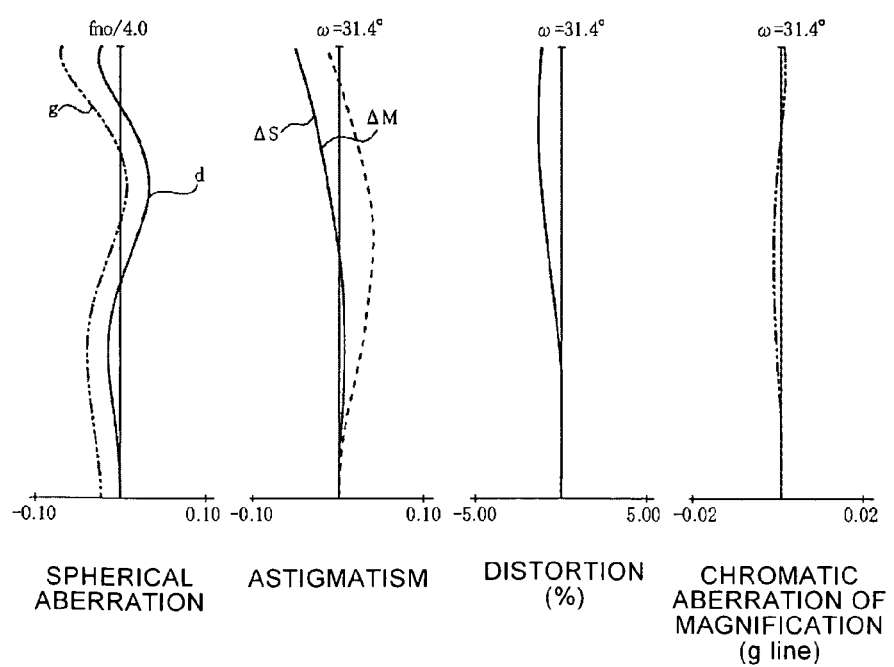
FIG. 18 shows aberration diagrams of the lens system of Numerical Example 9.
Figure 19:
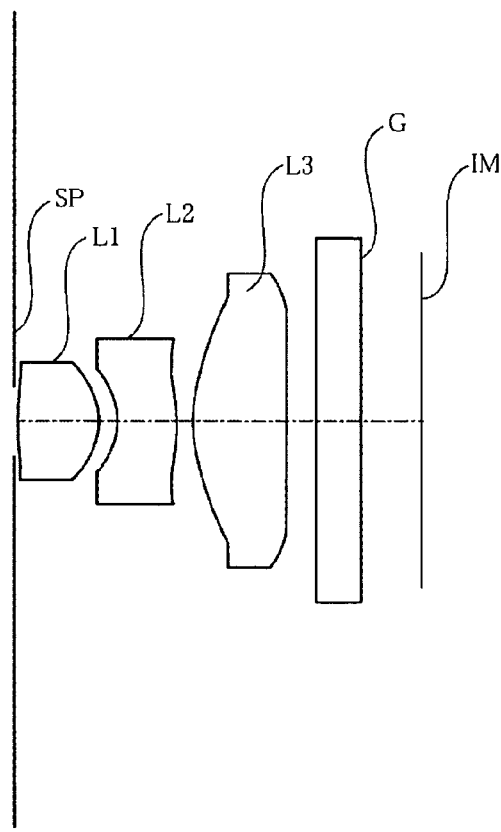
FIG. 19 is a sectional view of a lens system of Numerical Example 10.
Figure 20:
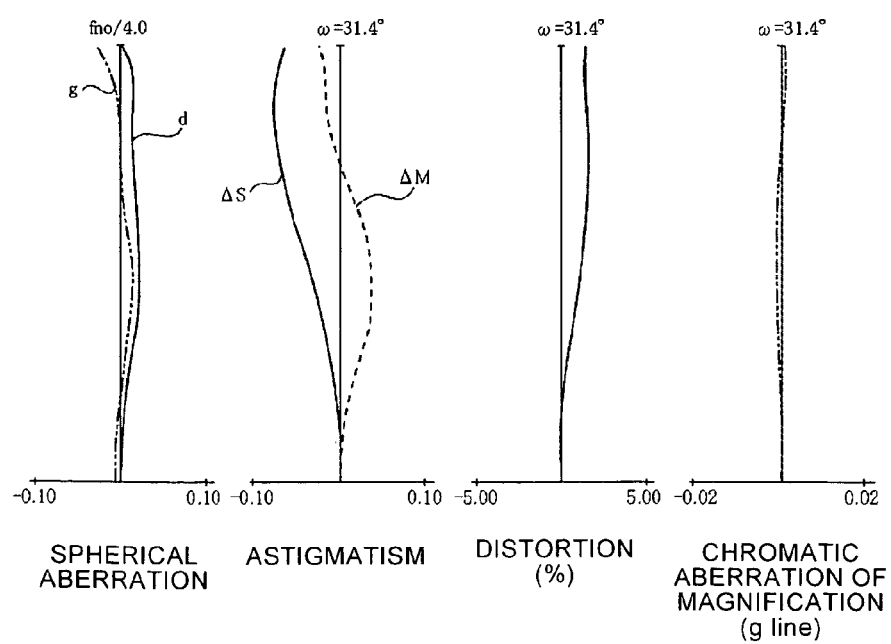
FIG. 20 shows aberration diagrams of the lens system of Numerical Example 10.
Figure 21:
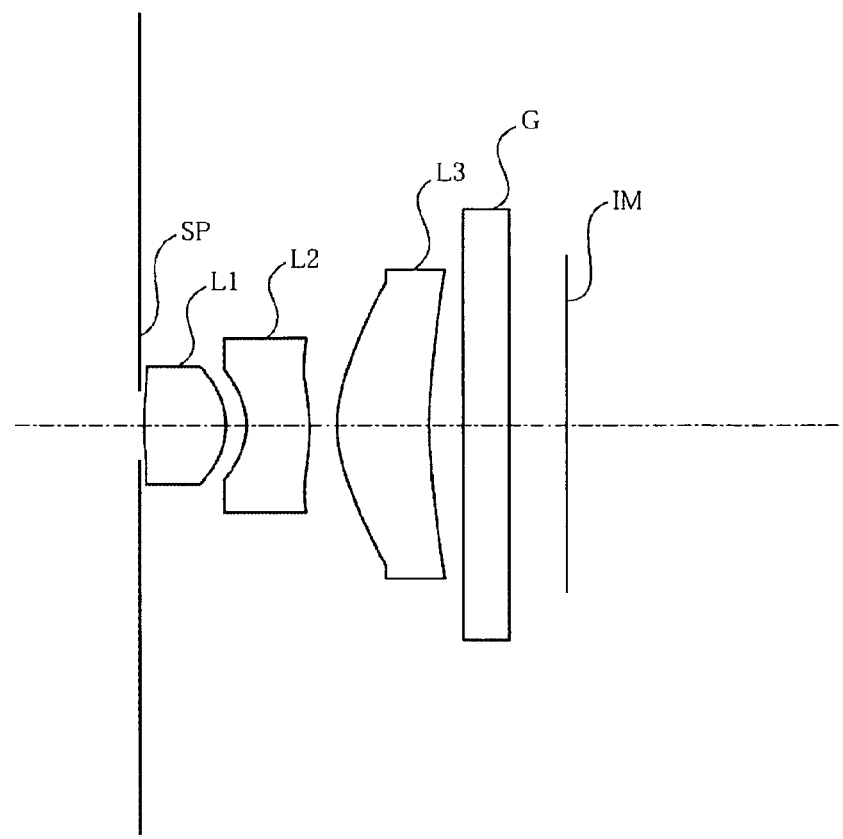
FIG. 21 is a sectional view of a lens system of Numerical Example 11.
Figure 22:
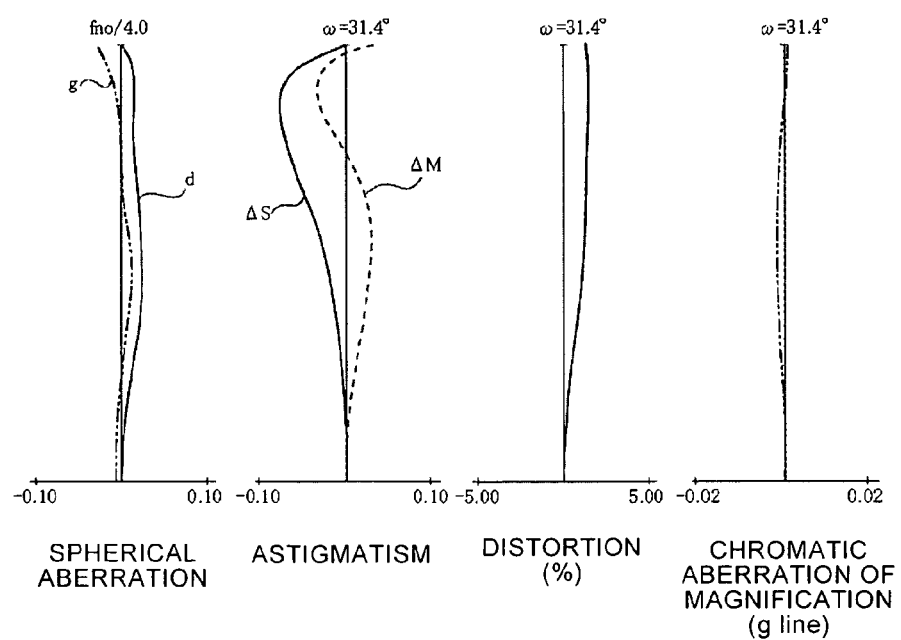
FIG. 22 shows aberration diagrams of the lens system of Numerical Example 11.
Figure 23:
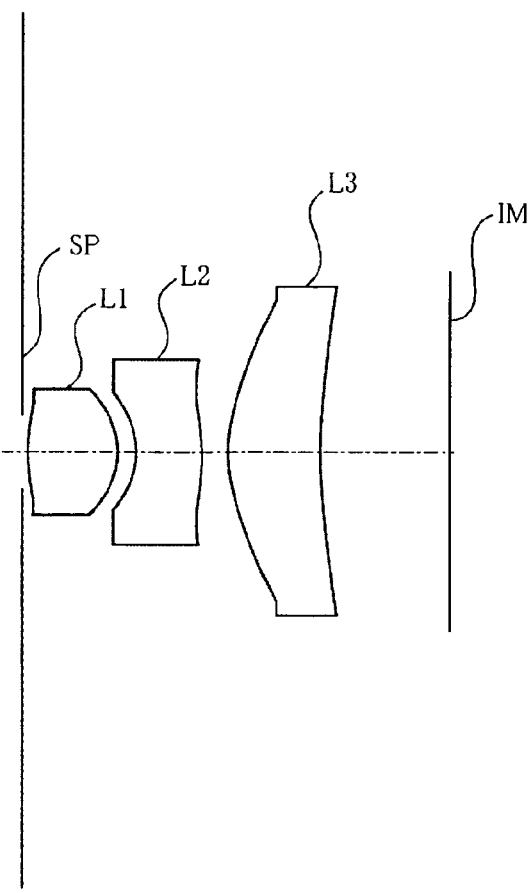
FIG. 23 is a sectional view of a lens system of Numerical Example 12.
Figure 24:
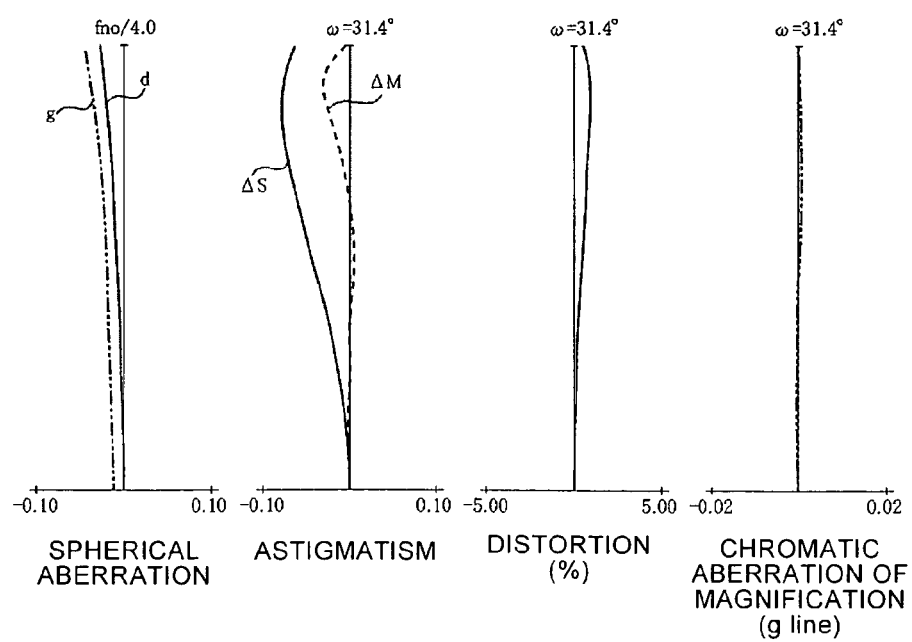
FIG. 24 shows aberration diagrams of the lens system of Numerical Example 12.
Figure 25:
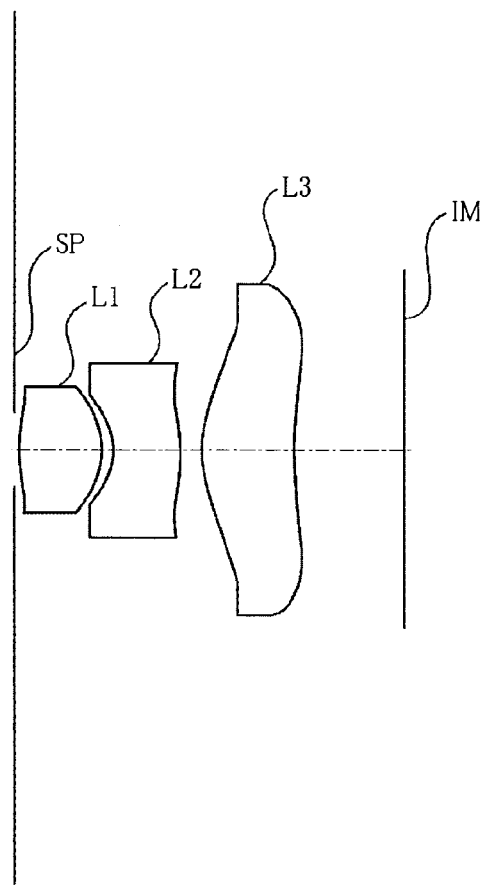
FIG. 25 is a sectional view of a lens system of Numerical Example 13.
Figure 26:
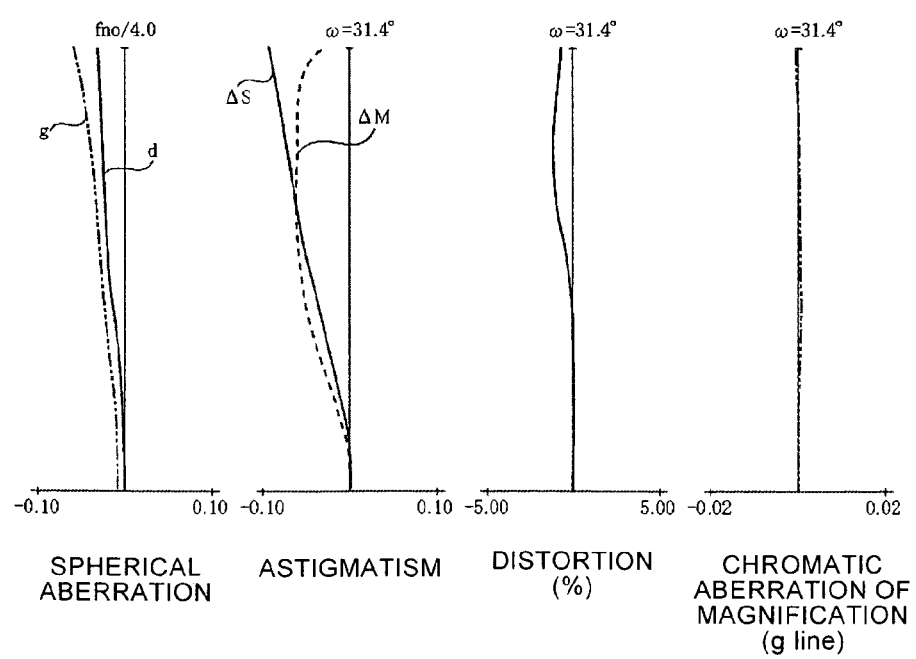
FIG. 26 shows aberration diagrams of the lens system of Numerical Example 13.
Figure 27:
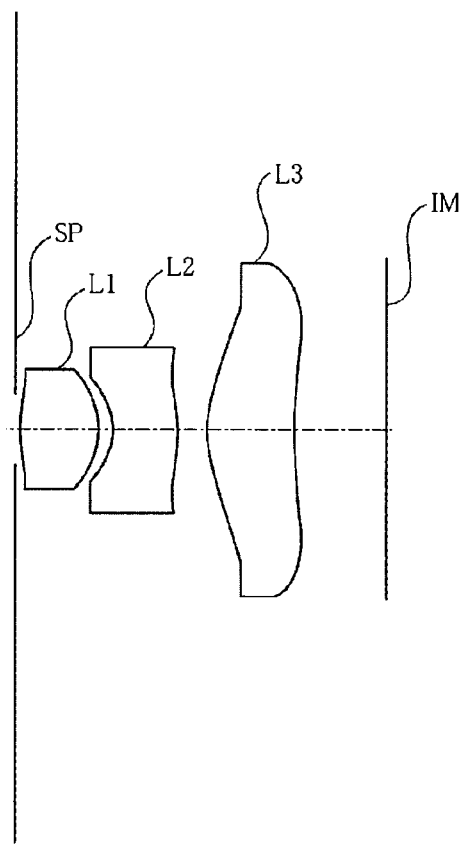
FIG. 27 is a sectional view of a lens system of Numerical Example 14.
Figure 28:
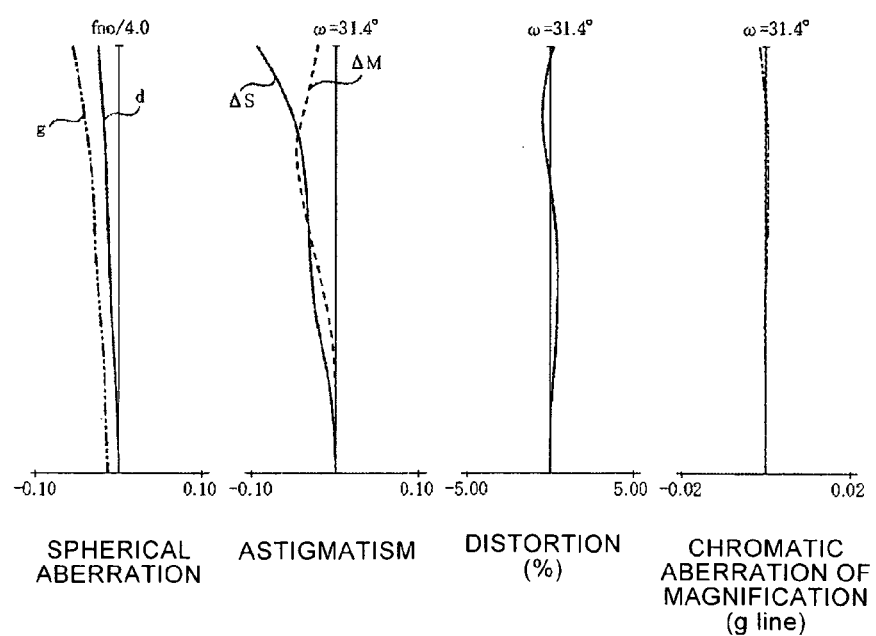
FIG. 28 shows aberration diagrams of the lens system of Numerical Example 14.
Figure 29:
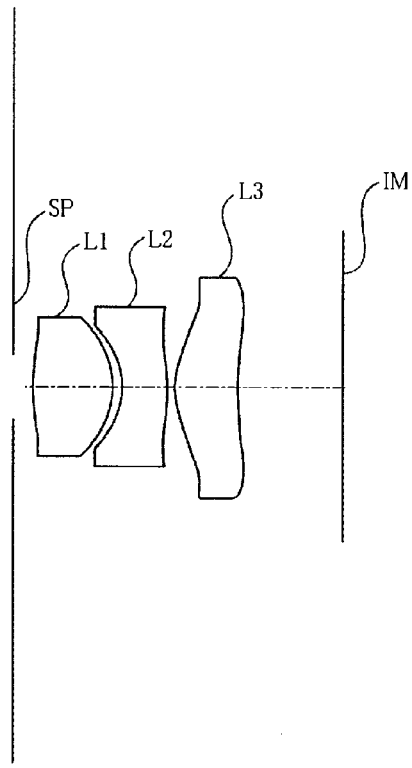
FIG. 29 is a sectional view of a lens system of Numerical Example 15.
Figure 30:
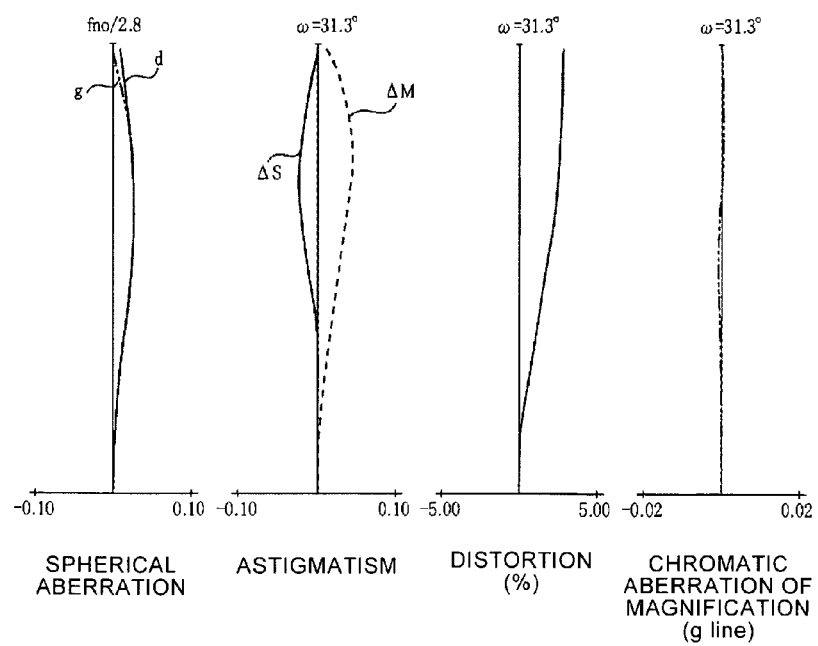
FIG. 30 shows aberration diagrams of the lens system of Numerical Example 15.
Figure 31:
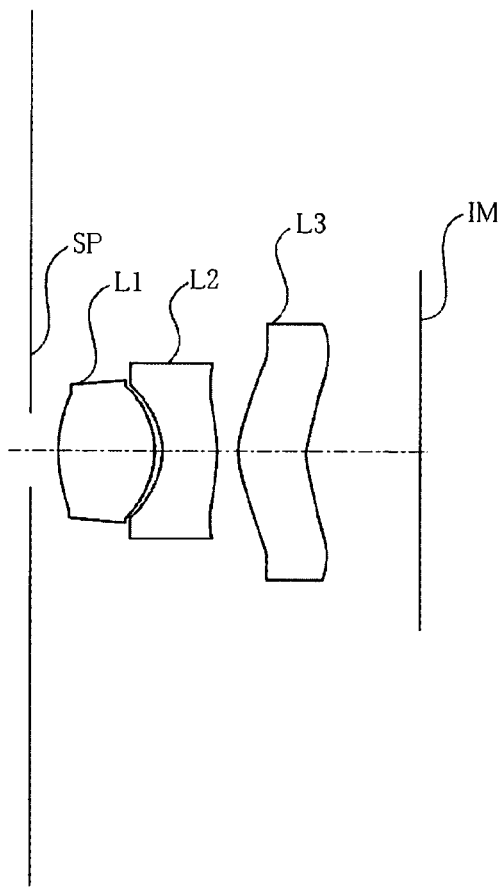
FIG. 31 is a sectional view of a lens system of Numerical Example 16.
Figure 32:
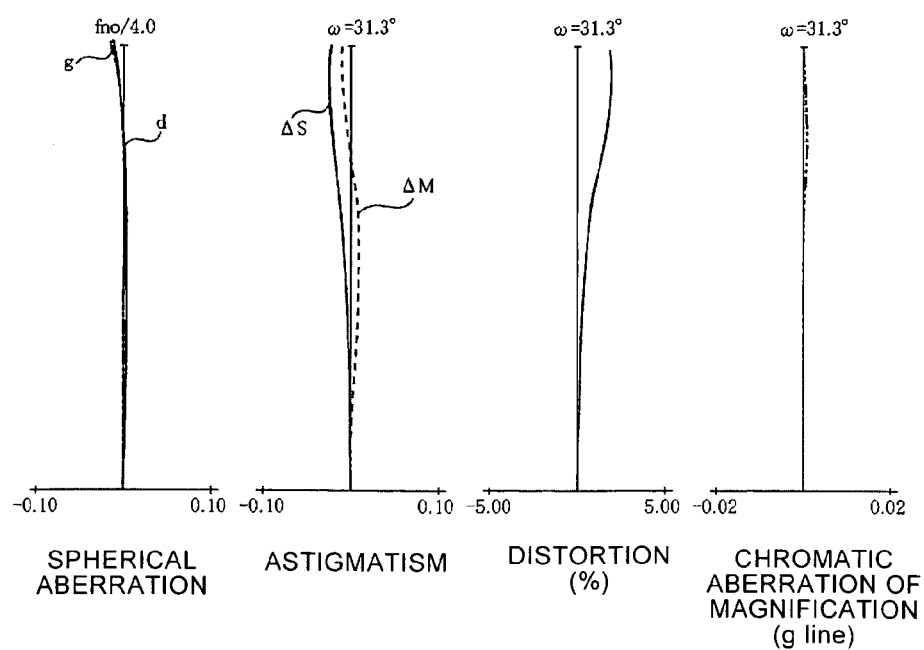
FIG. 32 shows aberration diagrams of the lens system of Numerical Example 16.
Figure 33:
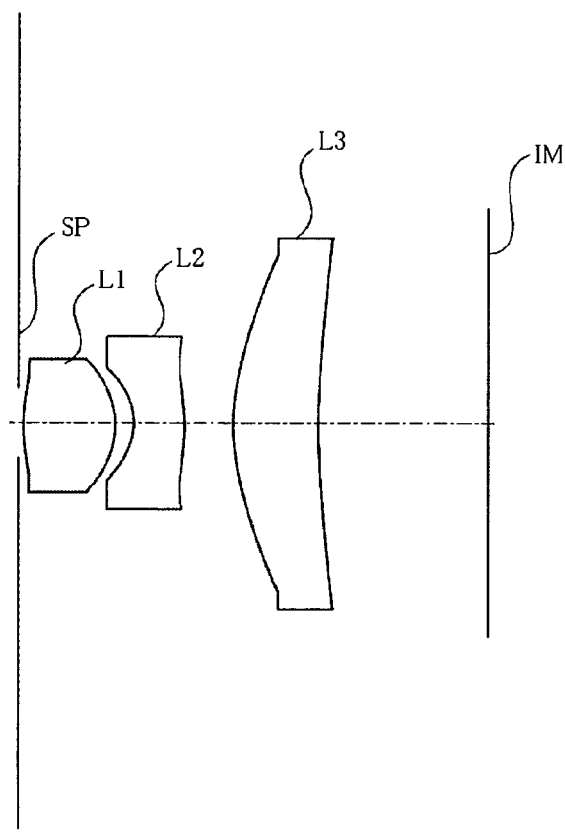
FIG. 33 is a sectional view of a lens system of Numerical Example 17.
Figure 34:
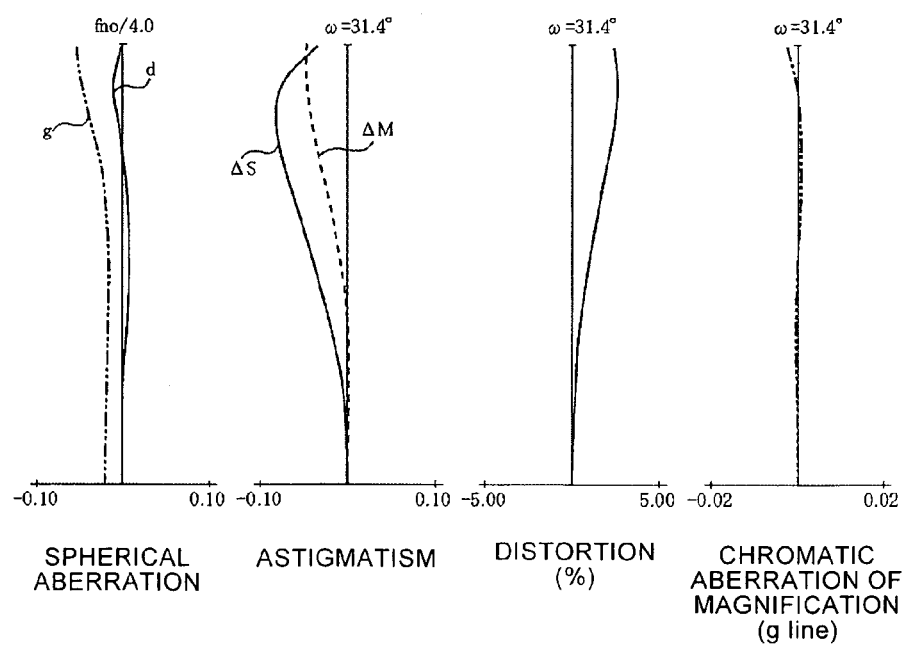
FIG. 34 shows aberration diagrams of the lens system of Numerical Example 17.
Figure 35:
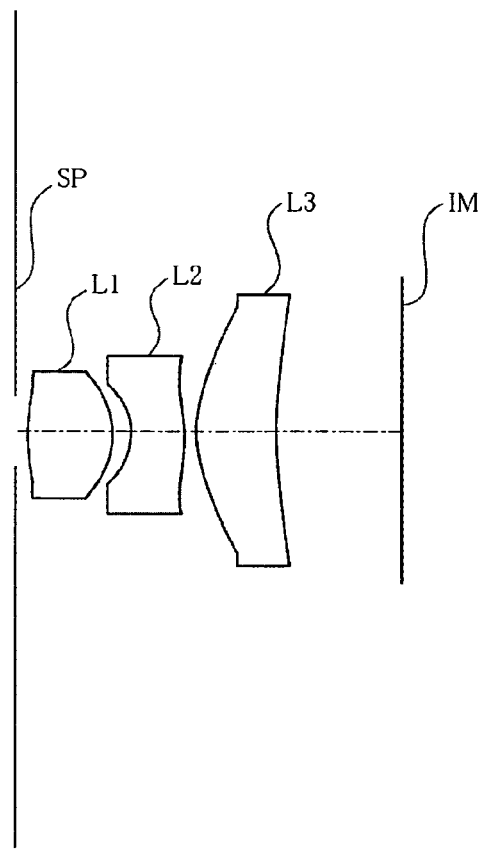
FIG. 35 is a sectional view of a lens system of Numerical Example 18.
Figure 36:
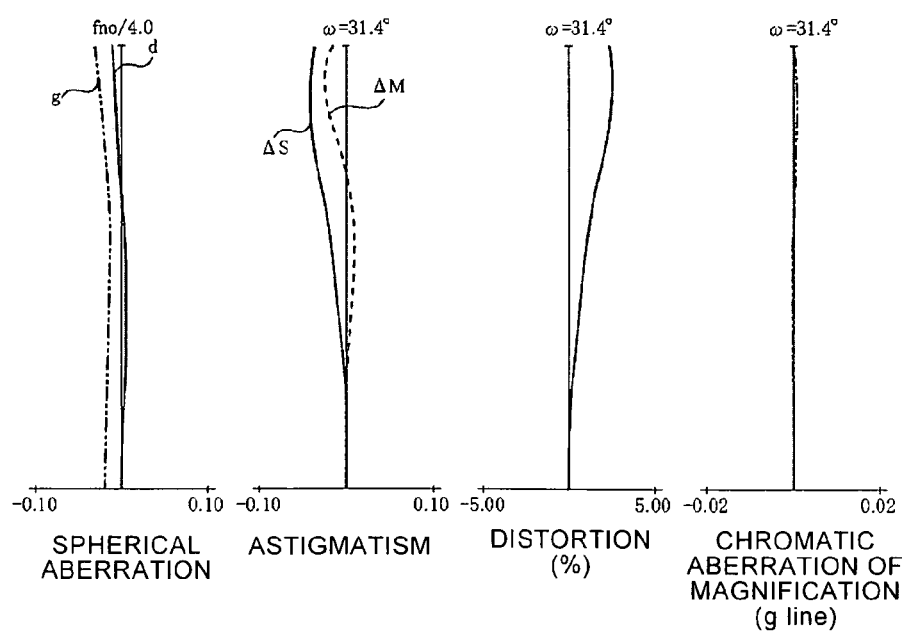
FIG. 36 shows aberration diagrams of the lens system of Numerical Example 18.
Figure 37:
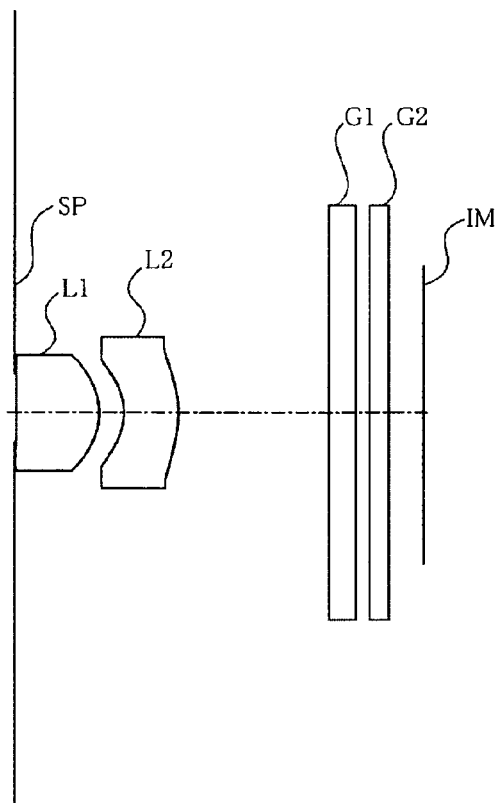
FIG. 37 is a sectional view of a lens system of Numerical Example 19.
Figure 38:
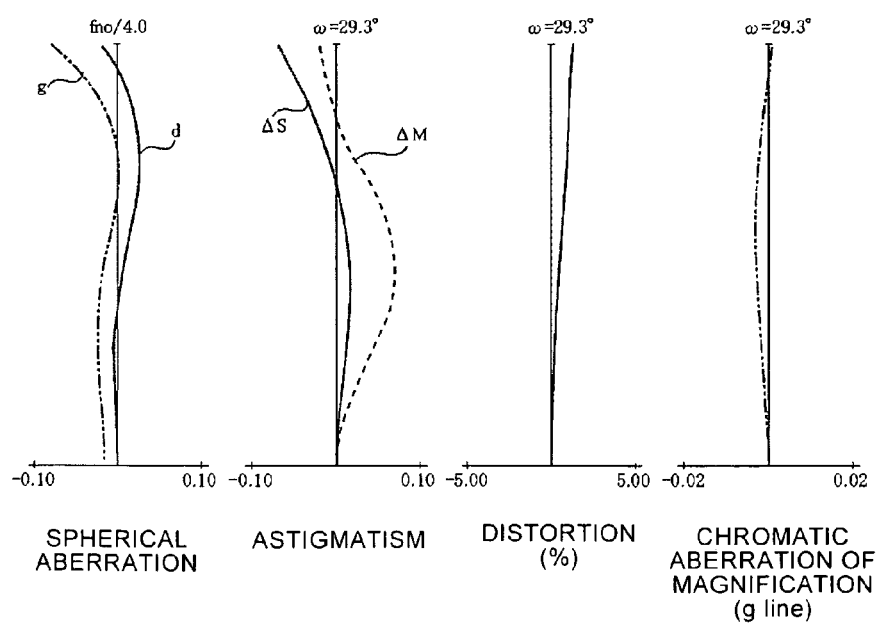
FIG. 38 shows aberration diagrams of the lens system of Numerical Example 19.

Each of the lens systems of the Numerical Examples besides Numerical Example 19, shown in FIG. 37, has a third lens L3 of positive refractive power. Each of the lens systems of Numerical Examples 20 to 23, shown in FIGS. 39, 41, 43, and 44, has a fourth lens L4, and the fourth lens L4 of each of FIGS. 39, 41, and 43 (Numerical Examples 20 to 22) has a positive refractive power while the fourth lens L4 of FIG. 44 (Numerical Example 23) has a negative refractive power.

In each sectional view, the left side is the subject side (object side) and the right side is the image plane side. With each of the lens systems of Embodiment 1, by appropriate setting of the shapes of the first lens L1 and the second lens L2 in the 2-unit, 2-lens arrangement, 3-unit, 3-lens arrangement, or 4-unit, 4-lens arrangement, a compact lens system of simple arrangement and good optical performance is realized.

Each of the lens systems of Embodiment 1 is arranged as a so-called front stop arrangement, in which an aperture stop SP is positioned at the most object side of the lens system, thereby providing an exit pupil length which is suited for recent solid-state image pickup elements. At the image side of the aperture stop SP is positioned the first lens L1, having a positive refractive power and having a convex surface, facing the image side and being of a strong refractive power relative to the object side, and in succession is positioned the second lens L2, having a negative refractive power and having a concave surface, facing the object side and being of strong refractive power relative to the image side.

With Embodiment 1, by making the image side surface of the first lens L1, of comparatively strong refractive power, have a convex shape and by making the object side surface of the second lens L2, also of strong refractive power, have a concave shape, both surfaces are made closer to being concentric shapes with respect to the center of the aperture stop SP. Such an arrangement restrains the occurrence of astigmatism, coma aberration, etc. in regard to an off-axial luminous flux and provides good image forming performance across the entire image area.

By making the object side surface of the first lens L1 comparatively gradual in curvature (large in radius of curvature), the occurrence of aberrations is reduced as much as possible, even though the surface will not be a concentric surface. Though the image side surface of the second lens L2 is also made comparatively gradual in curvature, it is made convex towards the image side and thus made somewhat close to a concentric shape. A characteristic of each objective lens of Embodiment 1 is that the lens surfaces of strong refractive power are thus made concentric and the lens surfaces outside the concentric regions are made gradual in curvature to realize a compact size and correction of aberrations simultaneously while securing the refractive powers required of the lenses L1 and L2.

The lens system of Numerical Example 19, shown in FIG. 37, is a two-lens arrangement of the first lens L1 and the second lens L2, with which good optical performance is realized with the minimum number of lenses.

Each of the lens systems of Numerical Examples 1 to 18, shown in FIGS. 1, 3, 5, 7, 9, 11, 13, 15, 17, 19, 21, 23, 25, 27, 29, 31, 33, and 35, have a third lens L3 of positive refractive power disposed at the image side of the second lens L2. This third lens L3 serves the role of a field lens by being positioned near the image plane, and the exit pupil can thus be set further distant from the image plane in comparison to a two-lens arrangement. Such an arrangement thus provides the merit of enabling a compact size and better telecentric characteristics to be realized at the same time.

Figure 39:
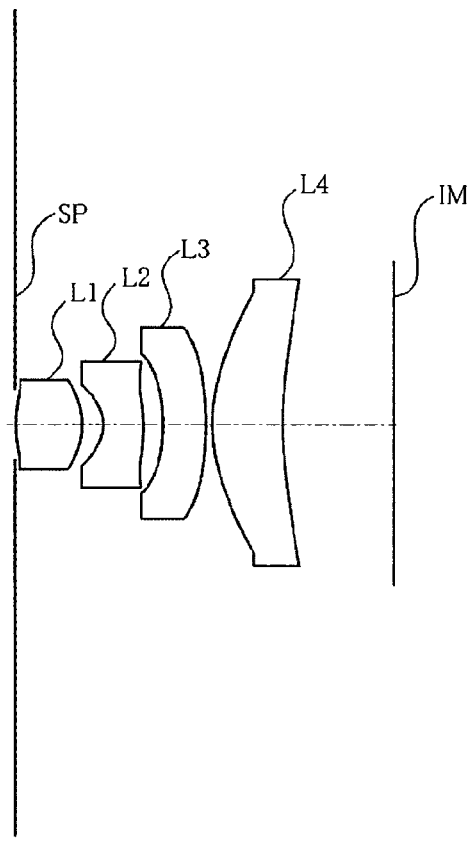
FIG. 39 is a sectional view of a lens system of Numerical Example 20.
Figure 40:
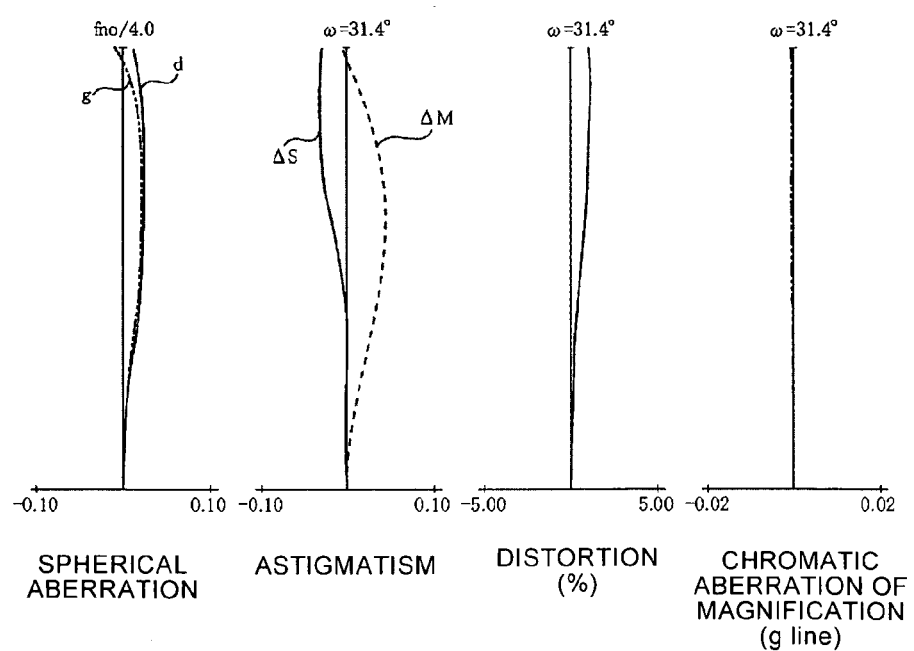
FIG. 40 shows aberration diagrams of the lens system of Numerical Example 20.
Figure 41:
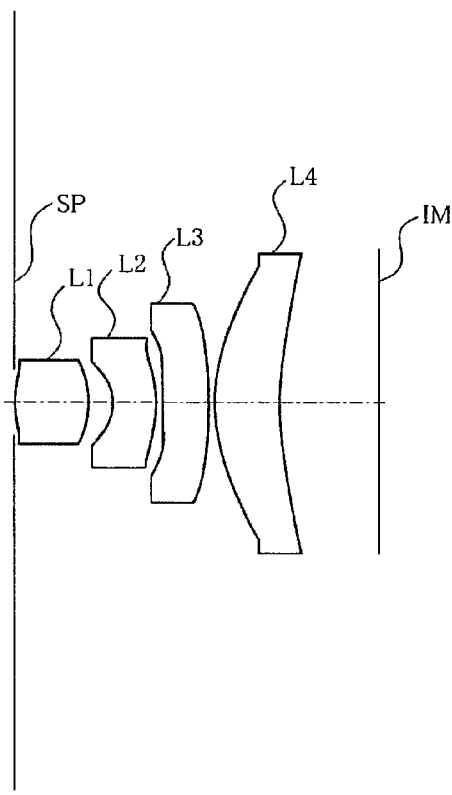
FIG. 41 is a sectional view of a lens system of Numerical Example 21.
Figure 42:
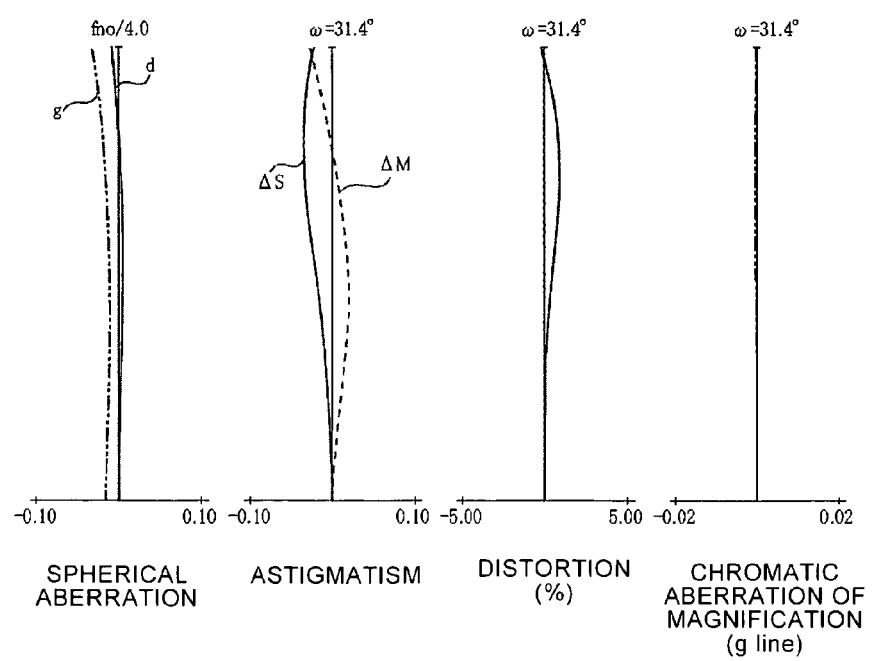
FIG. 42 shows aberration diagrams of the lens system of Numerical Example 21.
Figure 43:
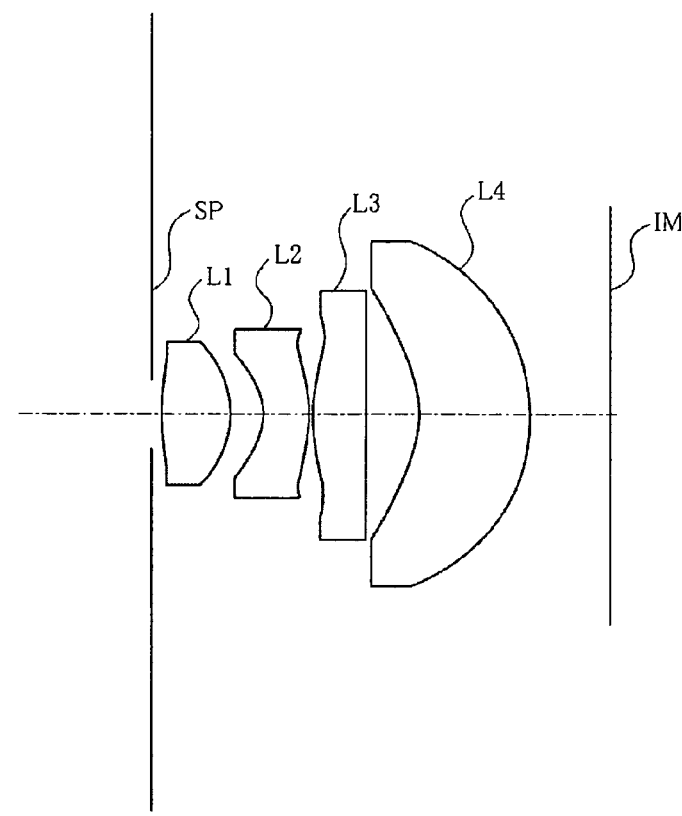
FIG. 43 is a sectional view of a lens system of Numerical Example 22.
Figure 44:
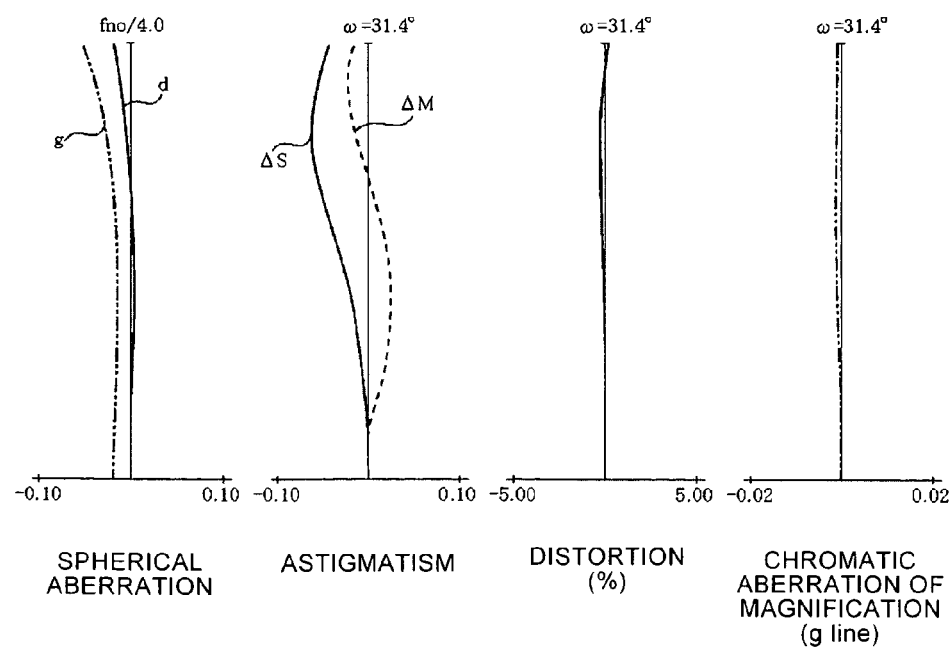
FIG. 44 shows aberration diagrams of the lens system of Numerical Example 22.
Figure 45:
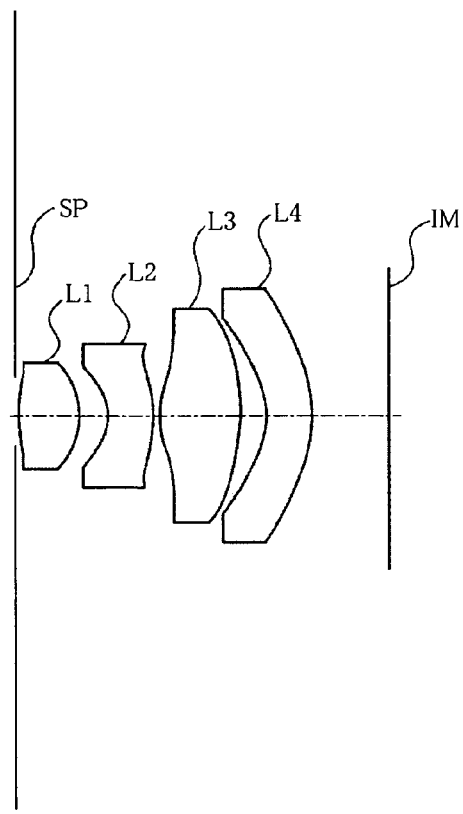
FIG. 45 is a sectional view of a lens system of Numerical Example 23.
Figure 46:
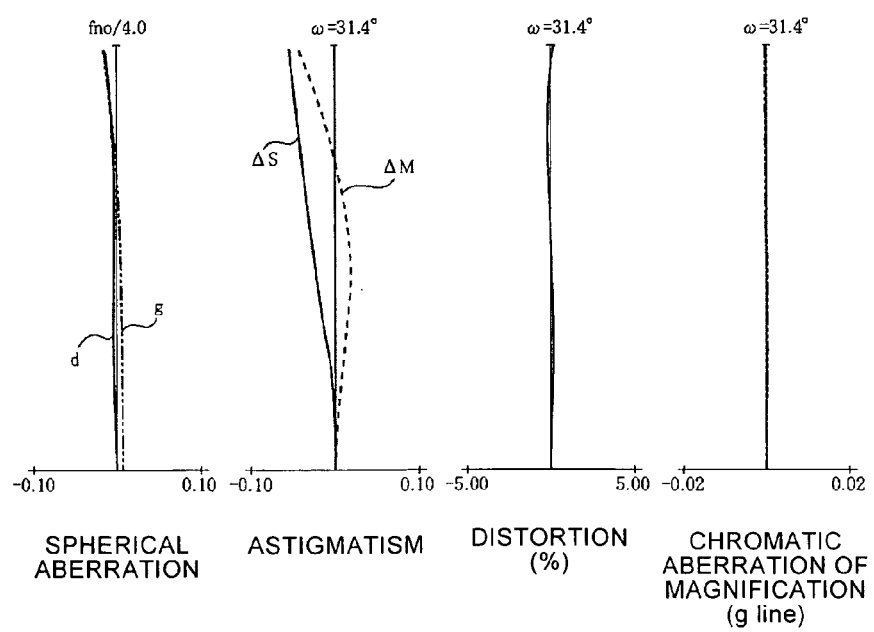
FIG. 46 shows aberration diagrams of the lens system of Numerical Example 23.

The lens systems of Numerical Examples 20 to 23 shown in FIGS. 39, 41, and 43 are characterized in that two lenses are positioned at the image side of the second lens L2. These two lenses are arranged so as to split the refractive power of the positive third lens L3 of the three-lens arrangements of Numerical Examples 1 to 18. In Numerical Examples 20 to 22, two positive lenses are positioned at the image side of the negative second lens L2 and by a positive refractive power being allocated to these lenses, the merit of restraining the various aberrations while providing even better optical performance is provided. In Numerical Example 23, a positive lens and a negative lens are disposed in that order at the image side of negative second lens L2. Since a telephoto type refractive power configuration is formed by these two lenses, the back focus can be shortened even more than in the case of a three-lens arrangement, thus providing a merit in terms of realizing compactness.

All of the lens systems of the two-lens, three-lens, and four-lens arrangements of Embodiment 1 are characterized in that a positive-negative telephoto type refractive power configuration is mainly arranged by the lens surface at the image side of the first lens L1 and the lens surface at the object side of the second lens L2. Thus by appropriately setting the interval between the first lens L1 and the second lens L2 while strengthening the refractive powers of the first lens L1 and the second lens L2 to some degree, the total optical length is shortened to realize compactness.

Even better optical performance can be provided by providing the first lens L1 and the second lens L2 with aspherical surfaces. In particular, the making of either of the image side lens surface of the first lens L1 and the object side lens surface of the second lens L2, which are comparatively steep in curvature (small in radius of curvature), an aspherical surface or the making of both surfaces aspherical surfaces is favorable in the case of using a solid-state image pickup element with a large number of pixels since the spherical aberration and coma aberration can then be corrected well.

Furthermore, the making of the object side lens surface of the first lens L1 an aspherical surface is especially effective in a case where the F number is to be made small to increase the aperture ratio since the spherical aberration correction ability will then be heightened.

Also, the making of the image side lens surface of the second lens L2 an aspherical surface heightens the coma aberration correction ability for an off-axial luminous flux, thus enabling good off-axial performance to be provided, especially when the field angle is made large.

Also by making the object side lens surface of the third lens L3 an aspherical surface, the curvature of field is corrected well to provide planar image forming characteristics.

The media of lenses L1, L2, L3 may be of glass material or of synthetic resin material (plastic material). In particular, the third lens L3 can be made weak in refractive power relative to the first lens L1 and the second lens L2, and thus when it is formed of a resin material, the focus variation due to temperature variation can be made relatively small. Also, though focus variation due to temperature variation becomes a problem when the first lens L1 and the second lens L2 are formed of resin material, since these lenses are strong in refractive power, this problem can be avoided by making these lenses similar in refractive power since there will then be a cancellation action in regard to the focus variation. The use of a resin material provides the merit that the lenses can be made aspherical and yet be manufactured at low cost in comparison to the case where a glass material is used.

Each of the lens systems of Embodiment 1 furthermore satisfies the following conditional expressions:

$$-1.0 < (R12+R11)/(R12-R11) < -0.1 \tag{1}$$

$$1.0 < (R22+R21)/(R22-R21) < 3.0 \tag{2}$$

where, R11 represents the radius of curvature of the object side surface of the first lens L1, R12 represents the radius of curvature of the image side surface of the first lens L1, R21 represents the radius of curvature of the object side surface of the second lens L2, and R22 represents the radius of curvature of the image side surface of the second lens L2.

The conditional expression (1) concerns the shape factor of the first lens L1. When the value of the conditional expression (1) is −1, the first lens L1 has a planoconvex shape, and when the value is between −1 and 0, the shape is a biconvex shape with the image side lens surface being greater in curvature (smaller in radius of curvature) than the object side lens surface. Exceeding of the upper limit of the conditional expression (1) is not preferable since the image side lens surface of the first lens L1 will then be gradual in curvature and deviate from a shape which is concentric with respect to the aperture stop SP, thus causing the off-axial performance to degrade due to the occurrence of astigmatism, coma aberration, etc. It is also not preferable for the lower limit not to be attained and the object side lens surface to thereby become a surface which is concave towards the object side since the occurrence of spherical aberration will then be excessive.

The conditional expression (2) concerns the shape factor of the second lens L2. When the value of the conditional expression (2) is 1, the second lens L2 has a concave-planar shape, and if the value is greater than 1, the lens has a meniscus shape with a concave surface directed towards the object side. When the lower limit of the conditional expression (2) is not attained, the image side lens surface becomes a concave surface, and though being weak in refractive index, becomes lowered in the action of reducing the occurrence of off-axial aberrations as a concentric surface. The incident angle of the off-axial luminous flux increases consequently and the occurrences of curvature of field and astigmatism become problems. When the upper limit is exceeded and the meniscus degree becomes too strong, the refractive power required of the negative lens cannot be set and the weakening of the action of canceling out the spherical aberration, chromatic aberration, and other aberrations with respect to the positive first lens L1 becomes a problem.

Each of the lens systems of Embodiment 1 furthermore satisfies the following conditional expressions:

$$0.1 < |f2/f| < 0.8 \tag{3}$$

$$0.5 < f3/f < 3.0 \tag{4}$$

$$(n1+n2)/2 > 0.1 \tag{5}$$

$$0.5 < d12/f < 3.0 \tag{6}$$

where, f2 represents the focal length of the second lens L2, f3 represents the focal length of the third lens L3, f represents the focal length of the entire lens system, n1 and n2 represent the refractive indices of the media (material) making up the first lens L1 and the second lens L2, respectively, and d12 represents the interval between the first lens L1 and the second lens L2.

The conditional expression (3) concerns the focal length, that is, the refractive power of the second lens L2. It is not preferable for the upper limit to be exceeded and the refractive power of the second lens L2 to be too weak since the Petzval's sum will then have a positive value which is too great and an under curvature of field will occur. It is also not preferable for the lower limit not to be attained and the refractive power of the second lens L2 to be too strong since the spherical aberration will then be over-corrected. The occurrences of central coma, partial blurring, etc., arising from the decentering of the second lens L2 due to manufacturing errors, also become problems.

The conditional expression (4) concerns the focal length, that is, the refractive power of the third lens L3. When the upper limit is exceeded and the refractive power of the third lens L3 is too weak, the action of the third lens L3 as a field lens weakens and since the exit pupil becomes close to the image plane, shading of the peripheral parts of the image area becomes a problem when a solid-state image pickup element is used. When the lower limit is not attained and the refractive power of the third lens L3 becomes too strong, the inability to secure the back focus necessary for insertion of a filter becomes a problem.

The conditional expression (5) concerns the average value of the refractive indices of the first lens L1 and the second lens L2. Since the first lens L1 and the second lens L2 of each objective lens of the present Embodiment form a positive-negative telephoto configuration in that order, both lenses are provided with some degree of refractive power in order to achieve shortening of the total length. Here, for a desired refractive power, the curvature of a lens becomes stronger the smaller the refractive index of the lens medium. It is thus not preferable for the lower limit not to be attained and the refractive indices to be too small since the lens surface curvatures will then be too great and the occurrence of spherical aberration and coma aberration of higher orders will become prominent, making correction difficult even with the use of aspherical surfaces.

The conditional expression (6) concerns the interval between the first lens L1 and the second lens L2. With each objective lens of the present Embodiment, a positive-negative telephoto type refractive power configuration is arranged, mainly by the image side lens surface of the first lens L1 and the object side lens surface of the second lens L2, and in forming this telephoto type refractive power configuration, it is important to set the interval between these lens surfaces appropriately. It is not preferable in terms of compactness for the lower limit of the conditional expression (6) not to be attained and the interval to be too small since the effect of arranging a telephoto type refractive power configuration will then be weakened and the total optical length will become long. When the upper limit is exceeded and the interval becomes too large, the inability to secure the back focus necessary for the insertion of filter becomes a problem.

With each of the lens systems of Embodiment 1, focusing from an object at infinity to an object at close distance is performed by moving the aperture stop SP and the entire lens system towards the object side.

The numerical data of the Numerical Examples 1 to 23 shall be indicated below. For each Numerical Example, Ri represents the radius of curvature of the i-th surface from the object side, Di represents the interval between i-th surface and (i+1)-th surface, and Ni and vi represent the refractive index and Abbe's number respectively for the d-line of the i-th member. f represents the focal length, Fno represents the F number, and ω represents the half field angle.

Each aspherical shape is expressed by the equation:

$$x = \frac{(1/R)h^2}{1 + \sqrt{\{1 - (1+k)(h/R)^2\}}} + Bh^4 + Ch^6 + Dh^8 + Eh^{10}$$

where R represents the paraxial radius of curvature, k represents a conical constant, and B, C, D, and E represent aspheric coefficients with the x axis being set in the optical axis direction, the h axis being set in the direction perpendicular to the optical axis, and the direction of propagation of light is set as being positive. "e±Z" represents "×10^{±Z}".

The relationship between the respective conditional expressions described above and the various numerical values of the Numerical Examples are shown in Table 1.

NUMERICAL EXAMPLE 1

| f = 4.500 | Fno = 4.00 | 2ω = 70.8° | |
|---|---|---|---|
| R1 = stop | D1 = 0.05 | | |
| R2 = 3.347 | D2 = 1.30 | N1 = 1.609700 | v1 = 57.8 |
| R3 = −1.082 | D3 = 0.29 | | |
| R4 = −0.781 | D4 = 1.00 | N2 = 1.814740 | v2 = 37.0 |
| R5 = −7.082 | D5 = 0.47 | | |
| R6 = 1.960 | D6 = 1.45 | N3 = 1.609700 | v3 = 57.8 |
| R7 = 8.103 | D7 = 0.50 | | |
| R8 = ∞ | D8 = 0.75 | N4 = 1.516330 | v4 = 64.1 |
| R9 = ∞ | | | |

Aspheric coefficients

Surface 2
k=6.16735e+00
B=−8.58545e−02  C=1.98508e−02  D=3.31078e−01
E=3.14242e−01

Surface 3
k=−4.37113e+00
B=−2.52227e−01  C=2.43272e−01  D=−2.90238e−01
E=1.30428e−01

Surface 4
k=−2.72888e+00
B=−7.80081e−02  C=1.52160e−01  D=−2.15722e−01
E=1.29902e−01

Surface 5
k=−4.93025e+01
B=2.29842e−02  C=2.04252e−02  D=−1.03655e−02
E=2.11986e−03

Surface 6
k=−6.61590e+00
B=4.04050e−03  C=−1.22536e−04  D=4.54480e−05
E=−3.78066e−06

Surface 7
k=−6.07398e+01
B=0.00000e+00  C=0.00000e+00  D=0.00000e+00
E=0.00000e+00

NUMERICAL EXAMPLE 2

| f = 4.500 | Fno = 4.00 | 2ω = 70.8° | |
|---|---|---|---|
| R1 = stop | D1 = 0.05 | | |
| R2 = 4.378 | D2 = 1.30 | N1 = 1.714300 | ν1 = 38.9 |
| R3 = −1.276 | D3 = 0.29 | | |
| R4 = −0.797 | D4 = 1.00 | N2 = 1.839170 | ν2 = 23.9 |
| R5 = −3.413 | D5 = 0.70 | | |
| R6 = 3.086 | D6 = 1.45 | N3 = 1.693840 | ν3 = 53.1 |
| R7 = 9.047 | D7 = 0.50 | | |
| R8 = ∞ | D8 = 0.75 | N4 = 1.516330 | ν4 = 64.1 |
| R9 = ∞ | | | |

Aspheric Coefficients

Surface 2
k=1.19204e+01
B=−7.99231e−02  C=3.48264e−02  D=−3.97640e−01
E=4.25675e−01

Surface 3
k=−5.30315e+00
B=−2.66192e−01  C=2.37700e−01  D=−2.17984e−01
E=7.83461e−02

Surface 4
k=−2.27857e+00
B=−6.67579e−02  C=1.75921e−01  D=−1.95240e−01
E=9.34029e−02

Surface 5
k=−1.97347e+01
B=2.47475e−02  C=2.91784e−02  D=−1.40981e−02
E=2.53952e−03

Surface 6
k=−6.04971e+00
B=3.13146e−03  C=−1.10723e−04  D=5.84522e−05
E=−4.99909e−06

Surface 7
k=−1.99347e+01
B=0.00000e+00  C=0.00000e+00  D=0.00000e+00
E=0.00000e+00

NUMERICAL EXAMPLE 3

| f = 4.500 | Fno = 4.00 | 2ω = 70.8° | |
|---|---|---|---|
| R1 = stop | D1 = 0.05 | | |
| R2 = 4.378 | D2 = 1.30 | N1 = 1.632460 | ν1 = 63.8 |
| R3 = −1.306 | D3 = 0.41 | | |
| R4 = −0.868 | D4 = 1.00 | N2 = 1.810000 | ν2 = 41.0 |
| R5 = −2.928 | D5 = 0.70 | | |
| R6 = 4.158 | D6 = 1.45 | N3 = 1.632460 | ν3 = 63.8 |
| R7 = 14.493 | D7 = 0.50 | | |
| R8 = ∞ | D8 = 0.75 | N4 = 1.516330 | ν4 = 64.1 |
| R9 = ∞ | | | |

Aspheric Coefficients

Surface 2
k=1.19116e+01
B=−8.03371e−02  C=3.48264e−02  D=−3.97640e−01
E=4.25675e−01

Surface 3
k=−5.34773e+00
B=−2.66097e−01  C=2.37700e−01  D=−2.17984e−01
E=7.83461e−02

Surface 4
k=−2.39867e+00
B=−6.65105e−02  C=1.75921e−01  D=−1.95240e−01
E=9.34029e−02

Surface 5
k=−1.97321e+01
B=2.38197e−02  C=2.91782e−02  D=−1.40981e−02
E=2.53952e−03

Surface 6
k=−6.05530e+00
B=3.81020e−03  C=−1.09442e−04  D=5.84536e−05
E=−4.99909e−06

Surface 7
k=−1.99346e+01
B=0.00000e+00  C=0.00000e+00  D=0.00000e+00
E=0.00000e+00

NUMERICAL EXAMPLE 4

| f = 4.500 | Fno = 4.00 | 2ω = 70.8° | |
|---|---|---|---|
| R1 = stop | D1 = 0.05 | | |
| R2 = 4.389 | D2 = 1.30 | N1 = 1.632460 | ν1 = 63.8 |
| R3 = −1.201 | D3 = 0.31 | | |
| R4 = −0.814 | D4 = 1.00 | N2 = 1.714300 | ν2 = 38.9 |
| R5 = −6.908 | D5 = 0.70 | | |
| R6 = 2.297 | D6 = 1.45 | N3 = 1.632460 | ν3 = 63.8 |
| R7 = 9.708 | D7 = 0.50 | | |
| R8 = ∞ | D8 = 0.75 | N4 = 1.516330 | ν4 = 64.1 |
| R9 = ∞ | | | |

Aspheric Coefficients

Surface 2
k=1.03994e+01
B=−8.07407e−02  C=4.48985e−02  D=−3.95718e−01
E=3.80434e−01

Surface 3
k=−4.63697e+00
B=−2.75335e−01  C=2.44660e−01  D=−2.13547e−01
E=6.85467e−02

Surface 4
k=−2.02576e+00
B=−7.95402e−02  C=1.88531e−01  D=−1.85872e−01
E=8.08186e−02

Surface 5
k=4.41681e−02
B=1.82612e−02  C=3.04258e−02  D=−1.31251e−02
E=2.20164e−03

Surface 6
k=−6.30152e+00
B=4.08270e−03  C=−2.83674e−04  D=5.69613e−05
E=−3.41579e−06

Surface 7
k=−3.03996e+01
B=0.00000e+00  C=0.00000e+00  D=0.00000e+00
E=0.00000e+00

NUMERICAL EXAMPLE 5

| f = 4.500 | Fno = 4.00 | 2ω = 70.8° | | |
|---|---|---|---|---|
| R1 = stop | D1 = 0.05 | | | |
| R2 = 4.571 | D2 = 1.30 | N1 = 1.609700 | ν1 = 57.8 |
| R3 = −1.184 | D3 = 0.34 | | | |
| R4 = −0.781 | D4 = 1.00 | N2 = 1.693200 | ν2 = 33.7 |
| R5 = −5.067 | D5 = 0.70 | | | |
| R6 = 2.229 | D6 = 1.45 | N3 = 1.609700 | ν3 = 57.8 |
| R7 = 8.238 | D7 = 0.50 | | | |
| R8 = ∞ | D8 = 0.75 | N4 = 1.516330 | ν4 = 64.1 |
| R9 = ∞ | | | | |

Aspheric Coefficients

Surface 2
k=1.29338e+01
B=−8.23872e−02    C=3.36772e−02    D=−3.95698e−01
E=3.80852e−01

Surface 3
k=−4.53440e+00
B=−2.80582e−01    C=2.45983e−01    D=−2.20601e−01
E=7.17222e−02

Surface 4
k=−1.97915e+00
B=−8.01820e−02    C=1.89678e−01    D=−1.90093e−01
E=8.22586e−02

Surface 5
k=−3.10803e+00
B=1.89307e−02    C=3.03647e−02    D=−1.32239e−02
E=2.18279e−03

Surface 6
k=−6.07102e+00
B=4.39684e−03    C=−3.21877e−04    D=5.72298e−05
E=−3.06716e−06

Surface 7
k=−2.25246e+01
B=0.00000e+00    C=0.00000e+00    D=0.00000e+00
E=0.00000e+00

NUMERICAL EXAMPLE 6

| f = 4.300 | Fno = 4.00 | 2ω = 59.4° | | |
|---|---|---|---|---|
| R1 = stop | D1 = 0.05 | | | |
| R2 = 7.000 | D2 = 1.30 | N1 = 1.805720 | ν1 = 40.9 |
| R3 = −1.491 | D3 = 0.35 | | | |
| R4 = −0.752 | D4 = 0.90 | N2 = 1.833100 | ν2 = 24.1 |
| R5 = −2.196 | D5 = 0.59 | | | |
| R6 = 3.434 | D6 = 1.30 | N3 = 1.509400 | ν3 = 56.0 |
| R7 = 94.939 | D7 = 0.93 | | | |
| R8 = ∞ | D8 = 0.45 | N4 = 1.516330 | ν4 = 64.1 |
| R9 = ∞ | D9 = 0.20 | | | |
| R10 = ∞ | D10 = 0.30 | N5 = 1.516330 | ν5 = 64.1 |
| R11 = ∞ | | | | |

Aspheric Coefficients

Surface 2
k=−1.98829e+01
B=−2.94376e−02    C=−2.28908e−01    D=6.49590e−01
E=−7.86874e−01

Surface 3
k=−7.14362e+00
B=−2.55662e−01    C=2.09030e−01    D=−1.26093e−01
E=1.26205e−02

Surface 4
k=−1.87028e+00
B=2.82005e−02    C=5.98744e−02    D=−5.46010e−03
E=−5.24608e−02

Surface 5
k=−4.39021e+00
B=6.36128e−02    C=5.74008e−03    D=1.00085e−04
E=−2.76199e−03

Surface 6
k=−4.01555e+00
B=−9.87994e−04    C=−9.88041e−04    D=3.84284e−04
E=−4.43128e−05

NUMERICAL EXAMPLE 7

| f = 4.500 | Fno= 4.00 | 2ω = 70.8° | | |
|---|---|---|---|---|
| R1 = stop | D1 = 0.05 | | | |
| R2 = 3.845 | D2 = 1.30 | N1 = 1.491710 | ν1 = 57.4 |
| R3 = −1.187 | D3 = 0.45 | | | |
| R4 = −0.668 | D4 = 1.00 | N2 = 1.583060 | ν2 = 30.2 |
| R5 = −2.931 | D5 = 0.27 | | | |
| R6 = 1.695 | D6 = 1.45 | N3 = 1.491710 | ν3 = 57.4 |
| R7 = 5.540 | D7 = 0.50 | | | |
| R8 = ∞ | D8 = 0.75 | N4 = 1.516330 | ν4 = 64.1 |
| R9 = ∞ | | | | |

Aspheric Coefficients

Surface 2
k=1.15337e+01
B=−8.57102e−02    C=4.08806e−02    D=−4.04333e−01
E=3.80692e−01

Surface 3
k=−4.47773e+00
B=−2.81430e−01    C=2.43700e−01    D=−2.19842e−01
E=7.15971e−02

Surface 4
k=−1.94984e+00
B=−7.92771e−02    C=1.90049e−01    D=−1.90377e−01
E=8.24546e−02

Surface 5
k=−3.35980e+00
B=2.24381e−02    C=3.06595e−02    D=−1.34054e−02
E=2.19811e−03

Surface 6
k=−5.72559e+00
B=5.29837e−03    C=−3.20106e−04    D=5.79967e−05
E=−2.83865e−06

Surface 7
k=−2.35691e+01
B=0.00000e+00    C=0.00000e+00    D=0.00000e+00
E=0.00000e+00

NUMERICAL EXAMPLE 8

| f = 4.500 | Fno = 4.00 | 2ω = 70.8° | | |
|---|---|---|---|---|
| R1 = stop | D1 = 0.05 | | | |
| R2 = 4.480 | D2 = 1.30 | N1 = 1.609700 | ν1 = 57.8 |
| R3 = −1.184 | D3 = 0.35 | | | |
| R4 = −0.736 | D4 = 1.00 | N2 = 1.693200 | ν2 = 33.7 |
| R5 = −4.513 | D5 = 0.51 | | | |
| R6 = 1.900 | D6 = 1.45 | N3 = 1.491710 | ν3 = 57.4 |
| R7 = 14.643 | D7 = 0.50 | | | |
| R8 = ∞ | D8 = 0.75 | N4 = 1.516330 | ν4 = 64.1 |
| R9 = ∞ | | | | |

Aspheric Coefficients

Surface 2
k=1.43365e+01
B=−9.14011e−02  C=8.39441e−02  D=−5.34140e−01
E=5.09483e−01

Surface 3
k=−4.53190e+00
B=−2.82355e−01  C=2.46895e−01  D=−2.20146e−01
E=7.21410e−02

Surface 4
k=−1.94437e+00
B=−8.00758e−02  C=1.89855e−01  D=−1.88017e−01
E=8.22559e−02

Surface 5
k=−3.39972e+00
B=1.92261e−02  C=3.02203e−02  D=−1.31812e−02
E=2.23192e−03

Surface 6
k=−5.99275e+00
B=4.83485e−03  C=−3.20884e−04  D=5.19715e−05
E=−2.65021e−06

Surface 7
k=−4.58361e+01
B=0.0000e+00  C=0.00000e+00  D=0.00000e+00
E=0.00000e+00

NUMERICAL EXAMPLE 9

| f = 4.500 | Fno = 4.00 | 2ω = 57.1° | | |
|---|---|---|---|---|
| R1 = stop | D1 = 0.05 | | | |
| R2 = 7.125 | D2 = 1.30 | N1 = 1.810000 | ν1 = 41.0 |
| R3 = −1.488 | D3 = 0.35 | | | |
| R4 = −0.771 | D4 = 0.90 | N2 = 1.839170 | ν2 = 23.9 |
| R5 = −2.285 | D5 = 0.60 | | | |
| R6 = 3.948 | D6 = 1.30 | N3 = 1.509400 | ν3 = 56.0 |
| R7 = 157.300 | D7 = 0.50 | | | |
| R8 = ∞ | D8 = 0.75 | N4 = 1.516330 | ν4 = 64.1 |
| R9 = ∞ | | | | |

Aspheric Coefficients

Surface 2
k=1.52136e+01
B=−3.42217e−02  C=−3.00596e−01  D=9.16633e−01
E=−1.14579e+00

Surface 3
k=.−7.11277e+00
B=−2.29421e−01  C=1.38893e−01  D=−3.05804e−02
E=−4.80414e−02

Surface 4
k=−2.37590e+00
B=−2.13107e−02  C=5.60026e−02  D=3.91037e−02
E=−9.71100e−02

Surface 5
k=−7.68532e+00
B=5.53530e−02  C=6.61574e−03  D=−4.28114e−04
E=−2.96930e−03

Surface 6
k=−4.00101e+00
B=−1.13763e−02  C=−3.55547e−03  D=2.34948e−03
E=−3.74832e−04

Surface 7
k=−1.78944e+08
B=−1.60562e−02  C=1.42173e−03  D=0.00000e+00
E=0.00000e+00

NUMERICAL EXAMPLE 10

| f = 4.501 | Fno = 4.00 | 2ω = 70.8° | | |
|---|---|---|---|---|
| R1 = stop | D1 = 0.05 | | | |
| R2 = 2.842 | D2 = 1.25 | N1 = 1.583126 | ν1 = 59.4 |
| R3 = −1.083 | D3 = 0.28 | | | |
| R4 = −0.764 | D4 = 1.00 | N2 = 1.814740 | ν2 = 37.0 |
| R5 = −6.085 | D5 = 0.33 | | | |
| R6 = 1.796 | D6 = 1.50 | N3 = 1.491710 | ν3 = 57.4 |
| R7 = 24.414 | D7 = 0.50 | | | |
| R8 = ∞ | D8 = 0.75 | N4 = 1.516330 | ν4 = 64.1 |
| R9 = ∞ | | | | |

Aspheric Coefficients

Surface 2
k=4.23811e+00
B=−8.89097e−02  C=5.72772e−02  D=−4.39155e−01
E=3.67743e−01

Surface 3
k=−4.42579e+00
B=−2.30878e−01  C=2.11768e−01  D=−3.36818e−01
E=1.81188e−01

Surface 4
k=−2.81268e+00
B=−5.24869e−02  C=1.13610e−01  D=−2.76950e−01
E=2.11041e−01

Surface 5
k=−2.72034e+01
B=4.27880e−02  C=9.38861e−03  D=−9.57823e−03
E=3.25755e−03

Surface 6
k=−6.21575e+00
B=−1.63149e−04  C=−3.48201e−04  D=−2.91717e−04
E=3.59434e−05

Surface 7
k=1.44403e+01
B=7.55552e−04  C=−2.15347e−03  D=0.00000e+00
E=0.00000e+00

NUMERICAL EXAMPLES 11

| | | |
|---|---|---|
| f = 4.500 | Fno = 4.00 | 2ω = 70.8° |
| R1 = stop | D1 = 0.05 | |
| R2 = 3.226 | D2 = 1.30 | N1 = 1.583126 ν1 = 59.4 |
| R3 = −1.101 | D3 = 0.31 | |
| R4 = −0.792 | D4 = 1.00 | N2 = 1.814740 ν2 = 37.0 |
| R5 = −5.364 | D5 = 0.44 | |
| R6 = 2.081 | D6 = 1.45 | N3 = 1.583126 ν3 = 59.4 |
| R7 = 11.393 | D7 = 0.50 | |
| R8 = ∞ | D8 = 0.75 | N4 = 1.516330 ν4 = 64.1 |
| R9 = ∞ | | |

Aspheric Coefficients

Surface 2
k=5.00738e+00
B=−7.95400e−02    C=2.87796e−02    D=−3.09738e−01
E=2.55455e−01

Surface 3
k=−4.81855e+00
B=−2.43287e−01    C=2.39557e−01    D=−3.12325e−01
E=1.43942e−01

Surface 4
k=−3.06122e+00
B=−6.55253e−02    C=1.43670e−01    D=−2.64191e−01
E=1.62563e−01

Surface 5
k=−6.40690e+01
B=2.89728e−02    C=1.74279e−02    D=−1.22688e−02
E=2.80179e−03

Surface 6
k=−6.04472e+00
B=3.96381e−03    C=5.71391e−05    D=5.57264e−06
E=−1.22618e−06

Surface 7
k=−5.31874e+01
B=0.00000e+00    C=0.00000e+00    D=0.00000e+00
E=0.00000e+00

NUMERICAL EXAMPLE 12

| | | |
|---|---|---|
| f = 4.500 | Fno = 4.00 | 2ω = 70.8° |
| R1 = stop | D1 = 0.05 | |
| R2 = 2.733 | D2 = 1.45 | N1 = 1.589130 ν1 = 61.3 |
| R3 = −1.226 | D3 = 0.28 | |
| R4 = −0.751 | D4 = 1.00 | N2 = 1.814740 ν2 = 37.0 |
| R5 = −3.664 | D5 = 0.37 | |
| R6 = 1.995 | D6 = 1.40 | N3 = 1.583130 ν3 = 59.5 |
| R7 = 7.185 | D7 = 1.94 | |

Aspheric Coefficients

Surface 2
k=−8.38274e−01
B=−2.08837e−02    C=−4.02686e−02    D=4.48434e−02
E=−1.14422e−01

Surface 3
k=−4.05309e+00
B=−1.16605e−01    C=−3.80119e−03    D=−2.45288e−02
E=8.75563e−03

Surface 4
k=−2.83282e+00
B=−7.95437e−02    C=7.11016e−02    D=−1.04932e−01
E=5.29961e−02

Surface 5
k=−4.48748e+00
B=7.52732e−02    C=−2.47790e−02    D=1.06064e−02
E=−1.96689e−03

Surface 6
k=−5.20297e+00
B=7.02500e−04    C=8.29486e−04    D=−9.12678e−05
E=4.34274e−06

Surface 7
k=−3.81764e+01
B=0.00000e+00    C=0.00000e+00    D=0.00000e+00
E=0.00000e+00

NUMERICAL EXAMPLE 13

| | | |
|---|---|---|
| f = 4.501 | Fno = 4.00 | 2ω = 70.8° |
| R1 = stop | D1 = 0.10 | |
| R2 = 1.983 | D2 = 1.25 | N1 = 1.589130 ν1 = 61.3 |
| R3 = −1.531 | D3 = 0.23 | |
| R4 = −0.818 | D4 = 1.00 | N2 = 1.814740 ν2 = 37.0 |
| R5 = −6.455 | D5 = 0.32 | |
| R6 = 1.388 | D6 = 1.40 | N3 = 1.491710 ν3 = 57.4 |
| R7 = 3.852 | D7 = 1.72 | |

Aspheric Coefficients

Surface 2
k=4.58606e+00
B=−9.01823e−02    C=−1.37000e−01    D=1.37663e−01
E=−5.42601e−01

Surface 3
k=−3.97477e+00
B=−2.57461e−01    C=1.53969e−01    D=−3.36933e−01
E=2.06825e−01

Surface 4
k=−3.58007e+00
B=−5.58810e−01    C=9.42463e−01    D=−1.28626e+00
E=7.47407e−01

Surface 5
k=−3.40282e−01
B=−6.74981e−02    C=1.28926e−01    D=−6.03928e−02
E=1.19873e−02

Surface 6
k=−5.58202e+00
B=−1.81477e−02    C=4.45479e−03    D=−1.75950e−04
E=−6.94920e−05

Surface 7
k=−4.35223e−01
B=−3.30398e−02    C=−1.31791e−03    D=1.16762e−03
E=−1.39114e−04

NUMERICAL EXAMPLE 14

| | | |
|---|---|---|
| f = 4.501 | Fno = 4.00 | 2ω = 70.8° |
| R1 = stop | D1 = 0.10 | |
| R2 = 1.985 | D2 = 1.25 | N1 = 1.589130 ν1 = 61.3 |
| R3 = −1.609 | D3 = 0.23 | |
| R4 = −0.867 | D4 = 1.00 | N2 = 1.814740 ν2 = 37.0 |
| R5 = −5.485 | D5 = 0.48 | |
| R6 = 1.496 | D6 = 1.40 | N3 = 1.491710 ν3 = 57.4 |
| R7 = 3.070 | D7 = 1.54 | |

Aspheric Coefficients

Surface 2
k=4.58907e+00
B=−8.92970e−02    C=−1.37341e−01    D=1.38807e−01
    E=−5.34763e−01

Surface 3
k=−4.01601e+00
B=−2.57713e−01    C=1.54343e−01    D=−3.33490e−01
    E=2.03944e−01

Surface 4
k=−3.50642e+00
B=−5.56975e−01    C=9.43454e−01    D=−1.28937e+00
    E=7.48294e−01

Surface 5
k=−1.92013e+00
B=−6.66755e−02    C=1.29249e−01    D=−6.04606e−02
    E=1.21338e−02

Surface 6
k=−4.99574e+00
B=−1.90402e−02    C=3.99856e−03    D=−3.29057e−05
    E=−6.85647e−05

Surface 7
k=−7.89170e−01
B=−3.23420e−02    C=−1.93826e−03    D=1.12646e−03
    E=−1.16186e−04

NUMERICAL EXAMPLE 15

| f = 3.700 | Fno = 2.80 | 2ω = 67.0° | | |
|---|---|---|---|---|
| R1 = stop | D1 = 0.33 | | | |
| R2 = 2.415 | D2 = 1.50 | N1 = 1.589130 | ν1 = 61.3 |
| R3 = −1.231 | D3 = 0.18 | | | |
| R4 = −0.739 | D4 = 0.80 | N2 = 1.814740 | ν2 = 37.0 |
| R5 = −13.424 | D5 = 0.15 | | | |
| R6 = 1.251 | D6 = 1.10 | N3 = 1.693500 | ν3 = 53.2 |
| R7 = 6.116 | D7 = 1.88 | | | |

Aspheric Coefficients

Surface 2
k=−1.61821e+01
B=1.26339e−01    C=−1.49453e−01    D=1.21928e−01
    E=−7.59444e−02

Surface 3
k=−6.29733e+00
B=−1.70865e−01    C=6.69123e−02    D=−3.54099e−02
    E=6.45041e−03

Surface 4
k=−3.46803e+00
B=−1.75461e−01    C=1.75124e−01    D=−1.03858e−01
    E=3.37914e−02

Surface 5
k=8.71851e+01
B=−9.94954e−02    C=1.11730e−01    D=−5.14524e−02
    E=1.29992e−02

Surface 6
k=−5.81742e+00
B=4.06992e−03    C=−9.85788e−03    D=−2.20726e−03
    E=7.06212e−04

Surface 7
k=−1.28505e+01
B=5.20884e−02    C=−4.00771e−02    D=8.97360e−03
    E=−8.09832e−04

NUMERICAL EXAMPLE 16

| f = 3.700 | Fno = 4.00 | 2ω = 67.0° | | |
|---|---|---|---|---|
| R1 = stop | D1 = 0.47 | | | |
| R2 = 2.364 | D2 = 1.45 | N1 = 1.589130 | ν1 = 61.3 |
| R3 = −1.041 | D3 = 0.18 | | | |
| R4 = −0.658 | D4 = 0.80 | N2 = 1.814740 | ν2 = 37.0 |
| R5 = −4.290 | D5 = 0.30 | | | |
| R6 = 1.107 | D6 = 1.10 | N3 = 1.583130 | ν3 = 59.5 |
| R7 = 2.255 | D7 = 1.60 | | | |

Aspheric Coefficients

Surface 2
k=9.90592e−01
B=−2.25054e−02    C=−4.54899e−02    D=4.63515e−02
    E=−4.69035e−02

Surface 3
k=−7.09828e+00
B=−2.54234e−01    C=1.06505e−01    D=2.98728e−02
    E=−3.67516e−02

Surface 4
k=−3.93497e+00
B=−3.12939e−01    C=3.62234e−01    D=−1.57703e−01
    E=2.19663e−02

Surface 5
k=1.41211e+00
B=−5.14026e−02    C=8.20506e−02    D=−2.41747e−02
    E=3.73633e−03

Surface 6
k=−4.37315e+00
B=−2.50635e−02    C=−7.73309e−04    D=1.34337e−03
    E=−4.33101e−04

Surface 7
k=−8.22941e−01
B=−6.01651e−02    C=9.12086e−03    D=−1.39839e−03
    E=3.10504e−05

NUMERICAL EXAMPLE 17

| f = 5.740 | Fno = 4.00 | 2ω = 60.5° | | |
|---|---|---|---|---|
| R1 = stop | D1 = 0.05 | | | |
| R2 = 2.571 | D2 = 1.45 | N1 = 1.589130 | ν1 = 61.3 |
| R3 = −2.070 | D3 = 0.33 | | | |
| R4 = −0.982 | D4 = 0.80 | N2 = 1.814740 | ν2 = 37.0 |
| R5 = −4.275 | D5 = 0.78 | | | |
| R6 = 2.844 | D6 = 1.40 | N3 = 1.693500 | ν3 = 53.2 |
| R7 = 0.180 | D7 = 2.68 | | | |

Aspheric Coefficients

Surface 2
k=−2.27464e+01
B=1.49141e−01    C=−2.32289e−01    D=2.46083e−01
    E=−1.66546e−01

Surface 3
k=−6.61484e+00
B=−1.85610e−01    C=7.83235e−02    D=−6.13472e−02
 E=1.36395e−02

Surface 4
k=−1.15689e+00
B=−5.74285e−02    C=1.80332e−01    D=−1.87820e−01
 E=6.58450e−02

Surface 5
k=7.02158e+00
B=1.35403e−02    C=6.88815e−02    D=−3.31295e−02
 E=7.16268e−03

Surface 6
k=−1.10625e+01
B=4.56501e−03    C=−4.40532e−04    D=3.89534e−05
 E=−1.42304e−06

Surface 7
k=−1.20791e+02
B=0.00000e+00    C=0.00000e+00    D=0.00000e+00
 E=0.00000e+00

NUMERICAL EXAMPLE 18

| | | | |
|---|---|---|---|
| f = 4.100 | Fno = 4.00 | 2ω = 61.7° | |
| R1 = stop | D1 = 0.18 | | |
| R2 = 2.284 | D2 = 1.40 | N1 = 1.589130 | ν1 = 61.3 |
| R3 = −1.379 | D3 = 0.27 | | |
| R4 = −0.652 | D4 = 0.80 | N2 = 1.814740 | ν2 = 37.0 |
| R5 = −2.937 | D5 = 0.20 | | |
| R6 = 1.472 | D6 = 1.25 | N3 = 1.589130 | ν3 = 61.3 |
| R7 = 5.970 | D7 = 1.89 | | |

Aspheric Coefficients

Surface 2
k=6.53519e+00
B=−8.75681e−02    C=−1.09551e−01    D=6.04964e−02
 E=−3.45418e−01

Surface 3
k=−1.10076e+01
B=−4.48064e−01    C=5.77645e−01    D=−6.63715e−01
 E=2.92539e−01

Surface 4
k=−3.25374e+00
B=−4.99765e−01    C=1.04344e+00    D=−1.24046e+00
 E=5.78701e−01

Surface 5
k=−2.38572e+00
B=−1.00182e−02    C=1.15899e−01    D=−6.42586e−02
 E=1.35901e−02

Surface 6
k=−7.76116e+00
B=5.84699e−03    C=5.80957e−04    D=−2.15246e−04
 E=2.48015e−05

Surface 7
k=−4.09970e+01
B=0.00000e+00    C=0.00000e+00    D=0.00000e+00
 E=0.00000e+00

NUMERICAL EXAMPLE 19

| | | | |
|---|---|---|---|
| f = 4.454 | Fno = 4.00 | 2ω = 57.6° | |
| R1 = stop | D1 = 0.05 | | |
| R2 = 28.400 | D2 = 1.30 | N1 = 1.772499 | ν1 = 49.6 |
| R3 = −1.348 | D3 = 0.39 | | |
| R4 = −0.848 | D4 = 0.90 | N2 = 1.833100 | ν2 = 24.1 |
| R5 = −1.840 | D5 = 2.41 | | |
| R6 = ∞ | D6 = 0.45 | N3 = 1.516330 | ν3 = 64.1 |
| R7 = ∞ | D7 = 0.20 | | |
| R8 = ∞ | D8 = 0.30 | N4 = 1.516330 | ν4 = 64.1 |
| R9 = ∞ | | | |

Aspheric Coefficients

Surface 2
k=8.36502e+02
B=−5.95348e−02    C=−2.47814e−01    D=5.35262e−01
 E=−6.50223e−01

Surface 3
k=−6.08034e+00
B=−2.77113e−01    C=2.21125e−01    D=−1.45743e−01
 E=2.45699e−02

Surface 4
k=−1.83361e+00
B=−1.21105e−02    C=1.18096e−01    D=−4.77536e−02
 E=−2.67989e−02

Surface 5
k=−1.84053e+00
B=4.88988e−02    C=1.15709e−02    D=5.92701e−03
 E=−5.24730e−03

NUMERICAL EXAMPLE 20

| | | | |
|---|---|---|---|
| f = 4.477 | Fno = 4.00 | 2ω = 57.4° | |
| R1 = stop | D1 = 0.00 | | |
| R2 = 2.197 | D2 = 1.06 | N1 = 1.524700 | ν1 = 56.2 |
| R3 = −1.513 | D3 = 0.30 | | |
| R4 = −0.776 | D4 = 0.70 | N2 = 1.583060 | ν2 = 30.2 |
| R5 = −2.820 | D5 = 0.24 | | |
| R6 = −3.474 | D6 = 0.70 | N3 = 1.524700 | ν3 = 56.2 |
| R7 = −3.335 | D7 = 0.10 | | |
| R8 = 2.675 | D8 = 1.13 | N4 = 1.524700 | ν4 = 56.2 |
| R9 = 4.125 | D9 = 1.71 | | |

Aspheric Coefficients

Surface 2
k=−2.29271e+01
B=2.12657e−01    C=−4.97671e−01    D=5.76067e−01
 E=−5.96599e−01

Surface 3
k=−9.22112e−01
B=−1.85746e−01    C=6.09550e−02    D=−8.36343e−02
 E=5.44753e−03

Surface 4
k=−7.67404e−01
B=−4.04114e−02    C=5.62222e−01    D=−6.51192e−01
 E=3.62743e−01

Surface 5
k=−2.60203e+01
B=−1.12970e−01    C=2.30159e−01    D=−1.35806e−01
    E=3.44147e−02

Surface 6
k=8.72949e+00
B=8.84236e−02    C=−1.54275e−01    D=1.12406e−01
    E=−4.15953e−02

Surface 7
k=−2.01151e+01
B=5.28310e−02    C=−5.62750e−02    D=1.83877e−02
    E=−2.96462e−03

Surface 8
k=−9.82080e−01
B=−2.08810e−02    C=3.49537e−03    D=−3.20603e−04
    E=1.22336e−05

Surface 9
k=−4.56042e+01
B=0.00000e+00    C=0.00000e+00    D=0.00000e+00
    E=0.00000e+00

NUMERICAL EXAMPLE 21

| | | |
|---|---|---|
| f = 4.479 | Fno = 4.00 | 2ω = 71.1° |
| R1 = stop | D1 = 0.00 | |
| R2 = 2.175 | D2 = 1.24 | N1 = 1.491710   ν1 = 57.4 |
| R3 = −1.755 | D3 = 0.39 | |
| R4 = −0.725 | D4 = 0.70 | N2 = 1.583060   ν2 = 30.2 |
| R5 = −2.355 | D5 = 0.10 | |
| R6 = 11.104 | D6 = 0.75 | N3 = 1.491710   ν3 = 57.4 |
| R7 = −12.331 | D7 = 0.10 | |
| R8 = 2.281 | D8 = 1.05 | N4 = 1.524700   ν4 = 56.2 |
| R9 = 2.944 | D9 = 1.67 | |

Aspheric Coefficients

Surface 2
k=2.12184e−01
B=−3.27859e−02    C=−3.10002e−02    D=−1.72472e−02
    E=−5.92294e−02

Surface 3
k=−4.91103e+00
B=−2.12527e−01    C=5.30936e−03    D=6.77408e−02
    E=−7.62324e−02

Surface 4
k=−1.68356e+00
B=−1.79957e−01    C=2.27703e−01    D=−2.28509e−02
    E=−6.74392e−02

Surface 5
k=1.37952e−01
B=−2.75881e−02    C=1.07214e−01    D=−3.34999e−02
    E=7.19586e−03

Surface 6
k=−6.83843e+01
B=−8.02638e−02    C=−2.79767e−03    D=4.41503e−03
    E=−4.67332e−03

Surface 7
k=4.67356e+01
B=2.44993e−02    C=−1.65263e−02    D=3.35222e−03
    E=−3.71150e−04

Surface 8
k=−1.32376e+01
B=1.93488e−02    C=−4.10484e−03    D=5.39604e−04
    E=−2.89967e−05

Surface 9
k=−2.10096e+01
B=0.00000e+00    C=0.00000e+00    D=0.00000e+00
    E=0.00000e+00

NUMERICAL EXAMPLE 22

| | | |
|---|---|---|
| f = 5.740 | Fno = 4.00 | 2ω = 60.5° |
| R1 = stop | D1 = 0.17 | |
| R2 = 2.966 | D2 = 1.15 | N1 = 1.491800   ν1 = 56.0 |
| R3 = −1.983 | D3 = 0.52 | |
| R4 = −0.789 | D4 = 0.70 | N2 = 1.585500   ν2 = 30.2 |
| R5 = −2.197 | D5 = 0.10 | |
| R6 = 2.394 | D6 = 0.85 | N3 = 1.524700   ν3 = 56.2 |
| R7 = 37.710 | D7 = 0.89 | |
| R8 = −2.305 | D8 = 1.80 | N4 = 1.524700   ν4 = 56.2 |
| R9 = −3.148 | D9 = 1.30 | |

Aspheric Coefficients

Surface 2
k=−2.93518e+00
B=−2.28495e−02    C=−3.64285e−02    D=4.77500e−03
    E=−3.73734e−02

Surface 3
k=−1.48490e+00
B=−8.46636e−02    C=−1.70004e−02    D=1.47367e−02
    E=−1.34475e−02

Surface 4
k=−2.09366e+00
B=−4.38542e−02    C=1.07912e−01    D=−5.80549e−02
    E=1.68042e−02

Surface 5
k=−1.10606e+00
B=5.81023e−02    C=2.73736e−02    D=−8.15190e−03
    E=1.70229e−03

Surface 6
k=−1.23588e+01
B=−7.99009e−03    C=−6.21774e−03    D=7.33792e−04
    E=−3.23767e−04

Surface 7
k=1.96932e+02
B=2.74421e−03    C=−2.75100e−04    D=−4.64186e−04
    E=4.92294e−05

Surface 8
k=−5.37875e−01
B=−2.96560e−03    C=4.34754e−03    D=9.14878e−06
    E=−2.15230e−05

Surface 9
k=−4.95890e−01
B=−2.78017e−03    C=−2.21654e−04    D=8.12402e−05
    E=−1.44185e−05

NUMERICAL EXAMPLE 23

| f = 4.078 | Fno = 4.01 | 2ω = 62.0° | | |
|---|---|---|---|---|
| R1 = stop | D1 = 0.05 | | | |
| R2 = 2.996 | D2 = 1.00 | N1 = 1.524700 | v1 = 56.2 | |
| R3 = −1.641 | D3 = 0.44 | | | |
| R4 = −0.677 | D4 = 0.70 | N2 = 1.583060 | v2 = 30.2 | |
| R5 = −2.506 | D5 = 0.10 | | | |
| R6 = 1.882 | D6 = 1.26 | N3 = 1.524700 | v3 = 56.2 | |
| R7 = −3.332 | D7 = 0.48 | | | |
| R8 = −1.354 | D8 = 0.72 | N4 = 1.583060 | v4 = 30.2 | |
| R9 = −2.310 | D9 = 1.22 | | | |

Aspheric Coefficients

Surface 2
k=−1.23624e+01
B=0.00000e+00  C=−1.30462e−01  D=1.16070e−01
E=−2.61064e−01

Surface 3
k=−3.66568e−01
B=−1.21079e−01  C=−2.80057e−02  D=9.28937e−02
E=−8.80623e−02

Surface 4
k=−2.20647e+00
B=−3.14623e−01  C=4.69745e−01  D=−9.55122e−02
E=−7.82209e−02

Surface 5
k=1.68609e+00
B=−3.42262e−02  C=1.08810e−01  D=−1.05214e−02
E=1.72397e−03

Surface 6
k=−1.06364e+01
B=−2.61412e−02  C=4.33284e−03  D=−1.13261e−02
E=4.12931e−03

Surface 7
k=5.41556e−01
B=5.25640e−02  C=−2.04724e−02  D=2.40962e−03
E=−2.46846e−04

Surface 8
k=−7.03483e−01
B=3.52387e−02  C=2.08498e−02  D=−6.08099e−03
E=3.40941e−04

Surface 9
k=−8.68417e−01
B=5.87767e−03  C=4.83556e−03  D=−1.04730e−03
E=5.47890e−05

TABLE 1

| Numerical Example | Conditional Expression | | | | | | |
|---|---|---|---|---|---|---|---|
| | (1) | (2) | (3) | (4) | (5) | (6) | (7) |
| 1 | −0.51 | 1.25 | 0.26 | 0.86 | 1.712 | 0.103 | 0.065 |
| 2 | −0.55 | 1.61 | 0.33 | 1.36 | 1.777 | 0.083 | 0.065 |
| 3 | −0.54 | 1.84 | 0.43 | 1.94 | 1.721 | 0.089 | 0.092 |
| 4 | −0.57 | 1.27 | 0.31 | 0.98 | 1.673 | 0.041 | 0.070 |
| 5 | −0.59 | 1.36 | 0.33 | 1.02 | 1.651 | 0.042 | 0.076 |
| 6 | −0.65 | 2.04 | 0.45 | 1.62 | 1.819 | 0.310 | 0.082 |
| 7 | −0.53 | 1.59 | 0.39 | 0.98 | 1.537 | 0.046 | 0.099 |
| 8 | −0.58 | 1.39 | 0.32 | 0.95 | 1.651 | 0.160 | 0.078 |
| 9 | −0.66 | 2.02 | 0.42 | 1.76 | 1.825 | 0.315 | 0.078 |
| 10 | −0.45 | 1.29 | 0.26 | 0.86 | 1.699 | 0.207 | 0.063 |

TABLE 1-continued

| Numerical Example | Conditional Expression | | | | | | |
|---|---|---|---|---|---|---|---|
| | (1) | (2) | (3) | (4) | (5) | (6) | (7) |
| 11 | −0.49 | 1.35 | 0.28 | 0.92 | 1.699 | 0.116 | 0.069 |
| 12 | −0.38 | 1.52 | 0.30 | 0.96 | 1.702 | 0.119 | 0.062 |
| 13 | −0.13 | 1.29 | 0.28 | 0.83 | 1.702 | 0.210 | 0.051 |
| 14 | −0.10 | 1.38 | 0.31 | 1.02 | 1.702 | 0.210 | 0.052 |
| 15 | −0.32 | 1.12 | 0.27 | 0.56 | 1.702 | 0.008 | 0.049 |
| 16 | −0.39 | 1.36 | 0.29 | 0.74 | 1.702 | 0.119 | 0.048 |
| 17 | −0.11 | 1.60 | 0.31 | 0.92 | 1.702 | 0.008 | 0.057 |
| 18 | −0.25 | 1.57 | 0.30 | 0.73 | 1.702 | 0.113 | 0.066 |
| 19 | −0.91 | 2.71 | 0.72 | — | 1.803 | — | 0.088 |
| 20 | −0.18 | 1.75 | 0.47 | 12.96 | 1.554 | 0.029 | 0.067 |
| 21 | −0.11 | 1.89 | 0.48 | 2.68 | 1.537 | 0.046 | 0.088 |
| 22 | −0.20 | 2.12 | 0.45 | 0.84 | 1.539 | 0.014 | 0.091 |
| 23 | −0.29 | 1.74 | 0.45 | 0.61 | 1.554 | 0.029 | 0.107 |

(Embodiment 2)

Figure 47:
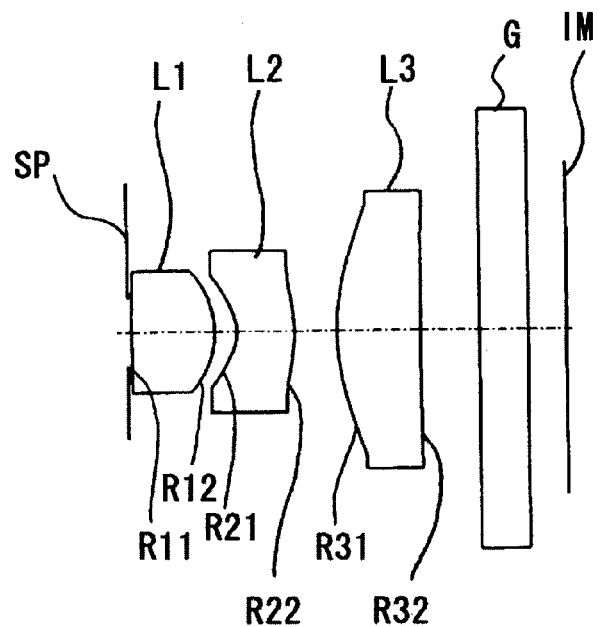
FIG. 47 is a sectional view of a lens system of Numerical Example 24.
Figure 48:
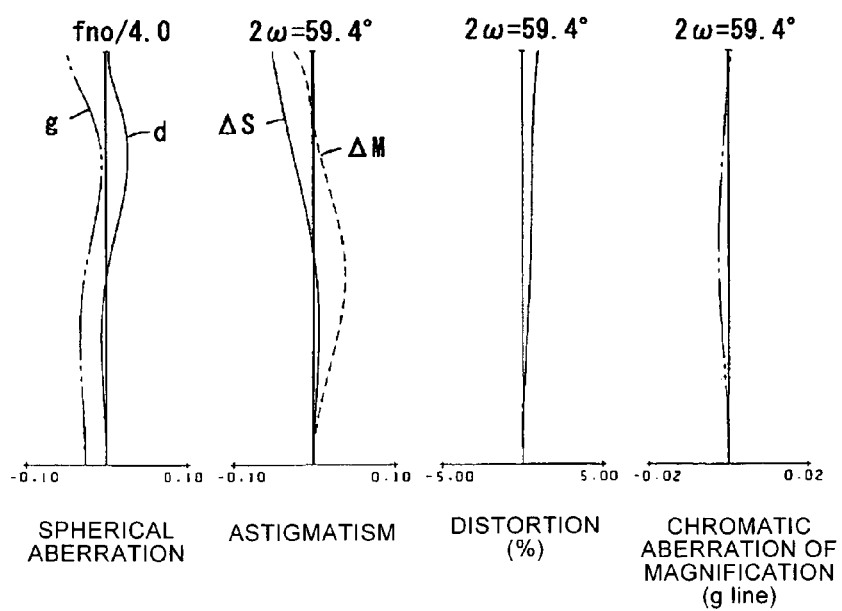
FIG. 48 shows aberration diagrams of the lens system of Numerical Example 24.

FIGS. 47 and 48 show a sectional view and aberration diagrams of a lens system of Numerical Example 24.

Figure 49:
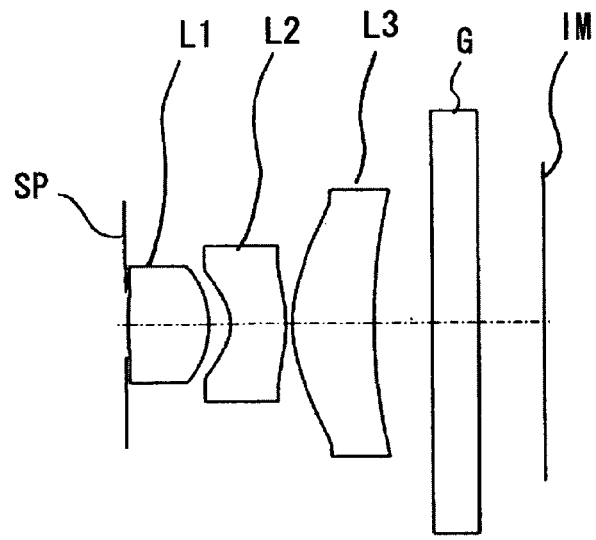
FIG. 49 is a sectional view of a lens system of Numerical Example 25.
Figure 50:
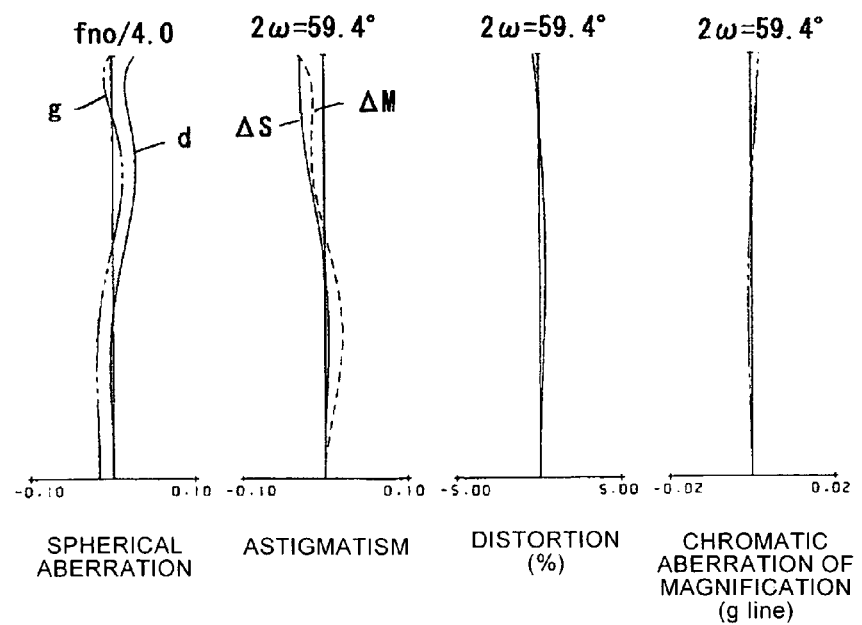
FIG. 50 shows aberration diagrams of the lens system of Numerical Example 25.

FIGS. 49 and 50 show a sectional view and aberration diagrams of a lens system of Numerical Example 25.

Figure 51:
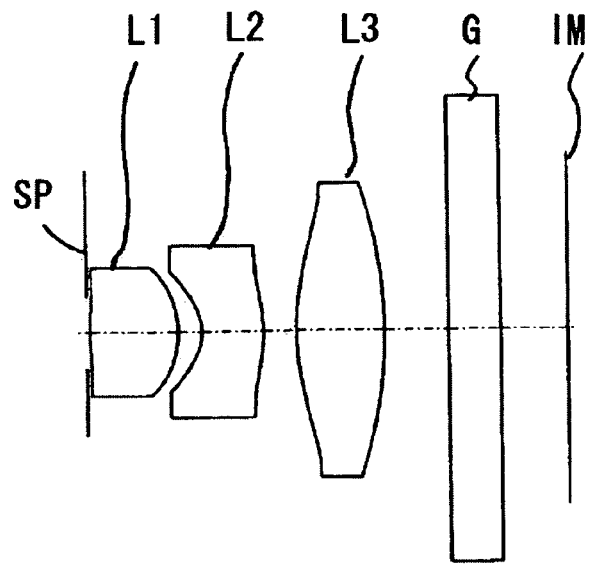
FIG. 51 is a sectional view of a lens system of Numerical Example 26.
Figure 52:
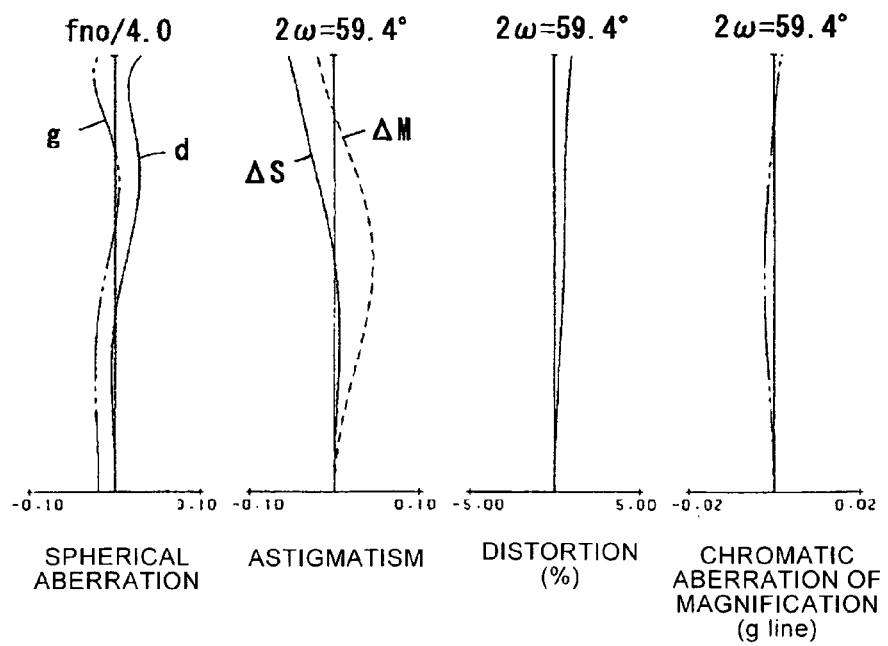
FIG. 52 shows aberration diagrams of the lens system of Numerical Example 26.

FIGS. 51 and 52 show a sectional view and aberration diagrams of a lens system of Numerical Example 26.

Figure 53:
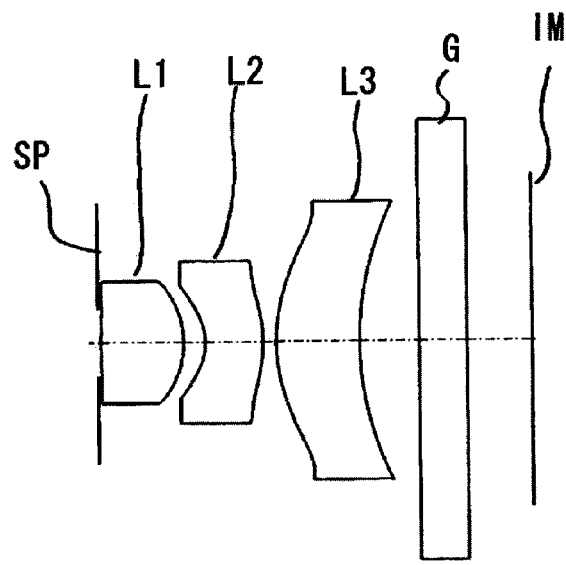
FIG. 53 is a sectional view of a lens system of Numerical Example 27.
Figure 54:
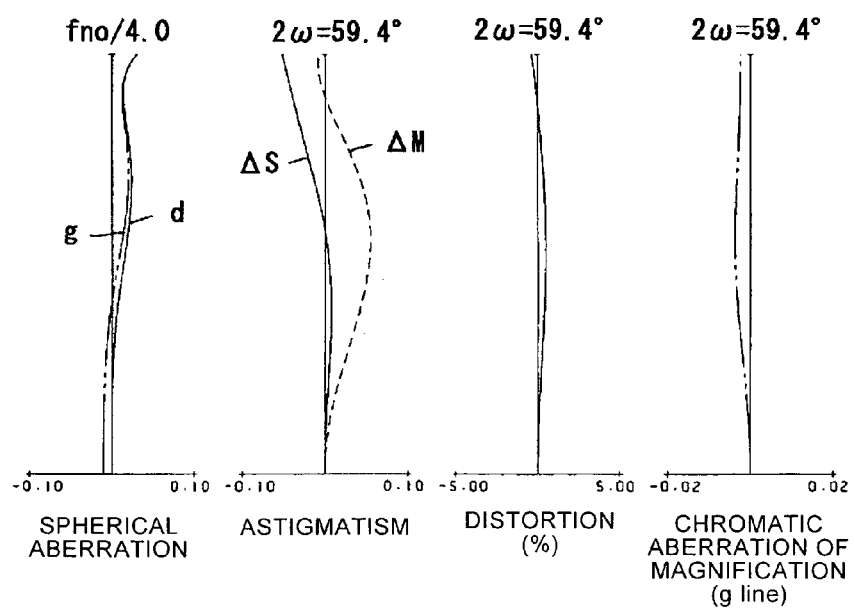
FIG. 54 shows aberration diagrams of the lens system of Numerical Example 27.

FIGS. 53 and 54 show a sectional view and aberration diagrams of a lens system of Numerical Example 27.

Figure 55:
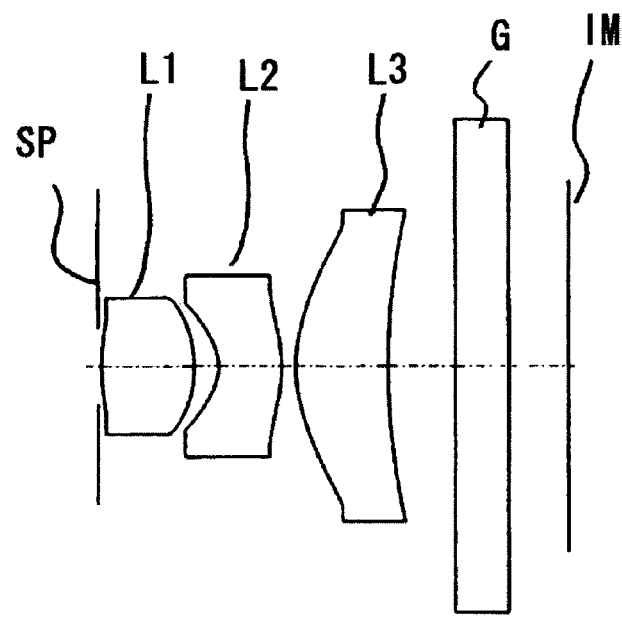
FIG. 55 is a sectional view of a lens system of Numerical Example 28.
Figure 56:
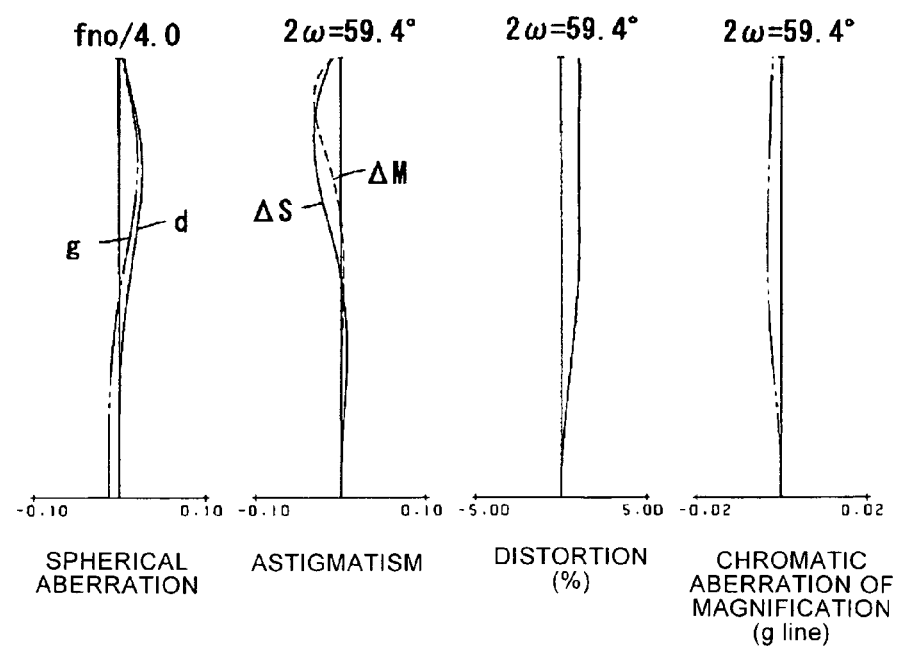
FIG. 56 shows aberration diagrams of the lens system of Numerical Example 28.

FIGS. 55 and 56 show a sectional view and aberration diagrams of a lens system of Numerical Example 28.

Figure 57:
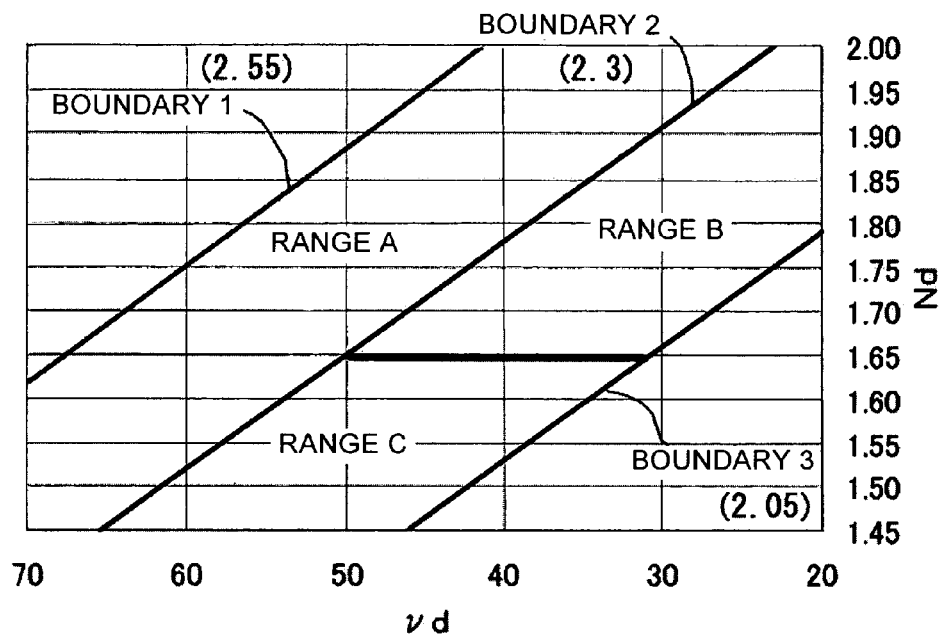
FIG. 57 is an explanatory diagram showing the relationship between refractive index and Abbe's number.

FIG. 57 is an explanatory diagram showing the relationship between refractive indices and Abbe's numbers of optical materials.

Hereinafter, Numerical Examples 24 to 28 shall be referred to collectively as "Embodiment 2". As with the lens systems of Embodiment 1, the lens systems of Embodiment 2 are also applied to image-taking lenses of digital cameras and mobile telephones and mobile terminals with camera, etc. The meanings of the symbols in the sectional views of the lens systems and the aberration diagrams are the same as those of Embodiment 1 and description thereof shall therefore be omitted.

As with Embodiment 1, with each lens system of Embodiment 2, focusing from an object at infinity to an object at close distance is performed by moving an aperture stop SP and the entire lens system towards the object side.

Also as with Embodiment 1, each of the lens systems of Embodiment 2 is arranged as a so-called front stop arrangement, in which the aperture stop SP is positioned at the most object side of the lens system, thereby providing an exit pupil distance which is suited for recent solid-state image pickup elements. A first lens L1, with which the absolute value of the refractive power of the image side surface is greater than that of the object side surface and the image side surface has a convex shape, and a second lens L2, with which the absolute value of the refractive power of the object side surface is greater than that of the image side surface and the object side surface has a concave shape, are positioned at the image side of the aperture stop SP.

The lens shapes of the first lens L1 which is positioned at the image side of the aperture stop SP and the second lens L2 which is positioned at the image side of the first lens L1 are set as described above and the surfaces of both are made close to shapes which are concentric with respect to the aperture stop SP. By such a lens arrangement, the occurrence of astigmatism, coma aberration, etc. are restrained for an off-axial luminous flux, thus providing good image forming performance across the entire image area.

By making the lens surface at the object side of the first lens L1 comparatively gradual in curvature, the occurrence of aberrations is reduced as much as possible, even though the surface will not be a concentric surface. Though the lens surface at the image side of the second lens L2 is also made comparatively gradual in curvature, the image side surface is made convex and thus made somewhat close to a concentric shape. As described above, lens surfaces of strong refractive power are thus made concentric and the lens surfaces outside the concentric regions are made gradual in curvature to realize a compact size and correction of aberrations simultaneously while securing the refractive powers required of the lenses L1 and L2.

Also, by being positioned near the image surface IM, the third lens L3 serves the role of a field lens and provides the action of setting the exit pupil distant from the image plane IM. By this arrangement, compactness and telecentric characteristics can be realized satisfactorily at the same time.

Also with each lens system of Embodiment 2, a telephoto type refractive power configuration which is a positive-negative refractive power lens system is mainly arranged by the lens surface at the image side of the first lens L1 and the lens surface at the object side of the second lens L2. By appropriately setting the interval between the first lens L1 and the second lens L2 while strengthening the refractive powers of the first lens L1 and the second lens L2 to some degree, the total optical length is shortened to realize compactness.

Also with each lens system of Embodiment 2, glass is used as the material of the first and second lenses L1 and L2. Though by providing the first lens L1 and the second lens L2 with some degree of refractive power, the telephoto type refractive power configuration can be strengthened and shortening of the total lens length is enabled, the precision requirements regarding the manufacturing errors of curvature, thickness, etc. tend to become stringent with such lenses with strong refractive powers. Generally in comparison to lenses formed of plastic material, lenses formed of glass material are better in processing precision and are small in shape variation and refractive index variation with respect to environmental variations of temperature, humidity, etc. Thus with the lens systems of Embodiment 2, by using glass as the material of the first and second lenses L1 and L2, high optical performance can be obtained even in consideration of manufacturing errors and environmental variations.

Also with each lens system of Embodiment 2, plastic is used as the material of third lens L3. In general, lenses which are formed of plastic material and are manufactured by injection molding, etc. are excellent in mass production properties and are more advantageous than lenses formed of glass material in terms of cost (in terms of manufacture). There is also the merit that the lenses can be made aspherical even while being low in cost (ready to manufacture). However, in comparison to lenses formed of glass material, lenses formed of plastic material are poorer in surface precision and are large in shape variation and refractive index variation with respect to variations of temperature, humidity, etc. With the lens systems of Embodiment 2, low cost is achieved while avoiding these problems by making the third lens L3 be weak in refractive power.

Though by making the third lens L3 weak in refractive power, the action as a field lens is weakened and it becomes difficult to set the exit pupil adequately distant from the image plane, with the lens systems of Embodiment 2, this problem is resolved by strengthening the refractive power of an air lens which is formed by the image side lens surface of the second lens L2 and the object side lens surface of the third lens surface L3. The air lens which is formed by the image side lens surface R22 of the second lens L2 and the object side lens surface R31 of the third lens surface L3 has a positive refractive power and provides the action of bending an off-axial principal luminous flux and making its incident angle onto the image plane IM small.

This consequently provides the action of setting the exit pupil distant from the image plane IM. The role of the field lens (third lens) L3 in the lens systems is thus served by the combination system of the air lens, formed by the lens surface R22 and lens surface R23, and the third lens L3.

By this arrangement, the exit pupil can be set distant from the image plane without making the refractive power of the third lens L3, formed of plastic material, very strong, thus low cost and telecentric properties are realized at the same time. Furthermore, by making one or more of the surfaces of the third lens L3, formed of plastic material, an aspherical surface, the correction of the field of curvature is facilitated and planar image forming characteristics are provided.

Also, even better optical performance can be provided by making at least one of the surfaces of the first lens L1 and the second lens L2 an aspherical surface. In particular, the making of either of the image side lens surface of the first lens L1 and the object side lens surface of the second lens L2, which are comparatively steep in curvature, an aspherical surface or the making of both surfaces aspherical surfaces is favorable in the case of using a solid-state image pickup element with a large number of pixels since the spherical aberration and coma aberration can then be corrected well.

Furthermore, the making of the object side lens surface of the first lens L1 an aspherical surface is especially effective in a case where the F number is to be made small to increase the aperture ratio since the spherical aberration correction ability will then be heightened.

Also, the making of the image side lens surface of the second lens L2 an aspherical surface heightens the coma aberration correction ability for the off-axial luminous flux, thus enabling good off-axial performance to be provided, especially when the field angle is made large.

Each of the lens systems of Embodiment 2 is arranged to satisfy the conditional expressions given below. Effects corresponding to the respective conditional expressions are thereby obtained.

In the following expressions, fa represents the focal length of the air lens formed by the image side lens surface of the second lens L2 and the object side lens surface of third lens L3, f represents the focal length of the entire system, fi represents the focal length of the i-th lens, Ni and vi represent the refractive index and Abbe's number of the material of the i-th lens, R11 represents the radius of curvature of the object side lens surface of the first lens L1 and R12 represents the radius of curvature of the image side lens surface of the first lens L1, R21 represents the radius of curvature of the object side lens surface of the second lens L2 and R22 represents the radius of curvature of the image side lens surface of the second lens L2, and R31 represents the radius of curvature of the object side lens surface of the third lens L3 and R32 represents the radius of curvature of the image side lens surface of the third lens L3.

$$0.5 < fa/f < 0.9 \tag{8}$$

$$-0.013v2+2.05 < N2 < -0.013v2+2.30 \tag{9}$$

$$N2 > 1.65 \tag{10}$$

$$0.1 < |f2|/f < 0.8 \tag{11}$$

$$-0.013v3 + 2.05 < N3 < -0.013v3 + 2.30 \tag{12}$$

$$N3 < 1.65 \tag{13}$$

$$0 < (R32 + R31)/(R32 - R31) < 5.0 \tag{14}$$

$$1.0 < f3/f < 3.0 \tag{15}$$

$$-0.013v1 + 2.30 < N1 < -0.013v1 + 2.55 \tag{16}$$

$$-1.0 < (R12 + R11)/(R12 - R11) < -0.1 \tag{17}$$

$$1.0 < (R22 + R21)/(R22 - R21) < 3.0 \tag{18}$$

The technical significance of the conditional expressions (8) to (18) shall now be described.

The conditional expression (8) defines the focal length of the air lens which is formed between the second lens L2 and the third lens L3. When the upper limit is exceeded and the focal length of the air lens is too long, that is, when the refractive power of the air lens is too weak, the action of setting the exit pupil distant from the image plane is weakened and shading becomes a problem when a solid-state image pickup element is used. It is not preferable for the lower limit not to be attained, that is, for the focal length of the air lens to be too short and thus the refractive power of the air lens to be too strong since the Petzval's sum will then become too great in the positive direction and it becomes difficult to correct the curvature of field even using aspherical surfaces.

The conditional expression (9) and the conditional expression (10) define the refractive index and the Abbe's number of the material of the second lens L2. FIG. 57 is a diagram showing the relationship between the Abbe's numbers vd and the refractive indices Nd and is for explaining the ranges for the materials for the respective lenses. In FIG. 57, the straight lines indicated as Boundaries 1, 2, and 3 are expressed as:

$$Nd = -0.013vd + K$$

with

K=2.55 for Boundary 1,
K=2.3 for Boundary 2, and
K=2.05 for Boundary 3.

In FIG. 57, both of the conditional expressions (9) and (10) hold in the Range B. When the upper limit of the conditional expression (9) is exceeded, the optical material will be positioned above Boundary 2 and a material which exists at this position is low in dispersion and thus tends to be inadequately corrected in chromatic aberration. When the lower limit of the conditional expression (9) is not attained, the optical material will be positioned below Boundary 3. A material which exists at this position is high in dispersion and is preferable in terms of chromatic aberration correction. However, though such a material which is a polycarbonate material or other plastic material exists, such a material that is a glass material does not exist. Thus from the standpoint of using a glass material for strengthening the refractive power, it is not preferable for the lower limit of the conditional expression (9) not to be attained. Also, when the lower limit of the conditional expression (10) is not attained, the refractive index will be low, and if the second lens L2 is at a position at which the lower limit of the conditional expression (10) is not attained when the refractive index of the material of the first lens L1 is somewhat increased to make the Petzval's sum small, it becomes difficult to make the difference of the Abbe's numbers of the materials of the first lens L1 and the second lens L2 large and the correction of chromatic aberration becomes inadequate.

The conditional expression (11) concerns the focal length, in other words, the refractive power of the second lens L2. It is not preferable for the upper limit to be exceeded and the refractive power of the second lens L2 to be too weak since the Petzval's sum will then be too great in the positive direction and an under curvature of field will occur. It is also not preferable for the lower limit not to be attained and the refractive power of the second lens L2 to be too strong since the spherical aberration will then be over-corrected. The occurrences of central coma, partial blurring, etc., due to decentering of the second lens L2 arising from manufacturing errors, also become problems.

The conditional expression (12) and the conditional expression (13) define the refractive index and the Abbe's number of the material of the third lens L3. In FIG. 57, both the conditional expression (12) and the conditional expression (13) hold in the Range C. When the upper limit of the conditional expression (12) is exceeded, the optical material will be positioned above Boundary 2. An optical material which exists at this position is a low dispersion material and is preferable in terms of reducing chromatic aberration. However, though such a material that is a glass material exists, such a material that is a plastic material does not exist. Thus from the standpoint of using a plastic material for cost reduction, it is preferable for the upper limit of the conditional expression (12) not to be exceeded. Also, when the lower limit of the conditional expression (12) is not attained, the optical material will be positioned below Boundary 3 and since a material which exists at this position is a high dispersion glass material, the occurrence of chromatic aberration becomes a problem. Also, since when the refractive index becomes so high such that the upper limit of the conditional expression (13) is exceeded, a corresponding plastic material will not exist, it is preferable, from the standpoint of cost, that the upper limit not to be attained.

The conditional expression (14) concerns lens shape factor of the third lens L3. In the case where the value of the conditional expression (14) is 0, both lens surfaces of the third lens L3 are convex in shape and when the value is less than 0, the shape will be such that the object side lens surface will have a weaker positive refractive power than the image side lens surface. When the positive refractive power of the object side lens surface of the third lens L3 weakens to the point where the lower limit is not attained, the refractive power of the air lens which is formed with the image side lens surface of the second lens L2 cannot be strengthened. It is also not preferable for the degree of the meniscus shape, with which a concave form is directed towards the image side, to be made too strong such that the upper limit is exceed since the action of setting the exit pupil closer to the image plane at the image side lens surface of the third lens L3 arises and cancels out the action of setting the exit pupil distant from the image surface by the strengthening of the refractive power of the air lens between the second lens L2 and the third lens L3.

The conditional expression (15) concerns the focal length, in other words, the refractive power of the third lens L3. When the refractive power of third lens L3 becomes so weak that the upper limit is exceeded, the weakening of action as a field lens becomes a problem. It is not preferable to further strengthen the positive refractive power of the air lens between the second lens L2 and the third lens L3 for compensation of the weakening of the field lens action since the Petzval's sum will then become too large and curvature of field will occur. It is also not preferable for the refractive power of the third lens L3 to become so strong that the lower limit is not attained since the influences of shape variations and refractive index variations due to environmental variations when the lens is formed of a plastic material will be too large and aberration variations and focus variations will occur. The securing of a back focus necessary for insertion of a filter is also disabled.

The conditional expression (16) defines the refractive index and Abbe's number of the material of the first lens L1. In the excess of the upper limit of the conditional expression (16) and above Boundary 1, a glass material does not exist. Thus from the standpoint of using a glass material to strengthen the refractive power, it is not preferable for the upper limit to be exceeded. Also, a material, with which the lower limit of the conditional expression (16) is not attained and which is thus positioned below Boundary 2, is high in dispersion, and with such a material, chromatic aberration occurs excessively in the case where the refractive power of the first lens L1 is to be strengthened and correction thereof by the second lens L2 is made difficult.

The conditional expression (17) concerns the lens shape factor of the first lens L1. When the value of the conditional expression (17) becomes −1, the lens shape is a planoconvex shape, and when the value is from −1 to 0, the lens shape is one in which both lenses surfaces are convex and the curvature of the image side lens surface is steeper than the curvature of the object side lens surface.

It is not preferable for the upper limit of the conditional expression (17) to be exceeded since the curvature of the image side lens surface of the first lens L1 will be gradual and the shape will deviate from that which is concentric with respect to the aperture stop SP and cause the off-axial performance to degrade due to the occurrences of astigmatism, coma aberration, etc. It is also not preferable for the lower limit not to be attained and the object side lens surface to become concave since the occurrence of spherical aberration will then be excessive.

The conditional expression (18) concerns the lens shape factor of the second lens L2. When the value of the conditional expression (18) is 1, the lens shape is concave-planar and when the value is greater than 1, the shape is a meniscus shape having a concave shape towards the object side. When the lower limit of the conditional expression (18) is not attained, the image side lens surface becomes a concave surface, and though being weak in refractive power, weakens in the action as a concentric shape of lowering the occurrence of off-axial aberrations. Since the angles of incidence of the off-axial luminous flux become large as a consequence, the occurrences of curvature of field and astigmatism become problems. Also, when the upper limit is exceeded and the degree of being a meniscus becomes too strong, the refractive power required of the second lens L2 cannot be set and the actions of canceling out spherical aberration, chromatic aberration, and other aberrations with respect to the first lens L1 are weakened.

Even more preferably, the numerical values of the conditional expressions (8), (10), (11), (13) to (15), (17), and (18) are set as follows.

$$0.55 < fa/f < 0.85 \quad (8a)$$

$$N2 > 1.67 \quad (10a)$$

$$0.2 < |f2|/f < 0.7 \quad (11a)$$

$$N3 < 1.60 \quad (13a)$$

$$0.1 < (R32+R31)/(R32-R31) < 4.0 \quad (14a)$$

$$1.1 < f3/f < 2.5 \quad (15a)$$

$$-0.9 < (R12+R11)/(R12-R11) < -0.15 \quad (17a)$$

$$1.3 < (R22+R21)/(R22-R21) < 2.5 \quad (18a)$$

The numerical data for Numerical Examples 24 to 28 are shown below.

The relationship between (8) to (18) and the various numerical values of Numerical Examples 24 to 18 are shown in Table 2.

NUMERICAL EXAMPLE 24

| f = 4.300 | Fno = 4.00 | 2ω = 59.4° | |
|---|---|---|---|
| R1 = stop | D1 = 0.05 | | |
| R2 = 6.761 | D2 = 1.30 | N1 = 1.805720 | ν1 = 40.9 |
| R3 = −1.475 | D3 = 0.35 | | |
| R4 = −0.764 | D4 = 0.90 | N2 = 1.833100 | ν2 = 24.1 |
| R5 = −2.312 | D5 = 0.66 | | |
| R6 = 3.398 | D6 = 1.30 | N3 = 1.509400 | ν3 = 56.0 |
| R7 = 67.661 | D7 = 0.93 | | |
| R8 = ∞ | D8 = 0.75 | N4 = 1.516330 | ν4 = 64.1 |
| R9 = ∞ | | | |

Aspheric Coefficients
R2 k=−1.97956e+01 B=−3.04820e−02 C=−2.28705e−01 D=6.59758e−01 E=−8.89772e−01
R3 k=−6.89457e+00 B=−2.53633e−01 C=2.04009e−01 D=−1.29954e−01 E=−1.30197e−03
R4 k=−1.88295e+00 B=2.76209e−02 C=6.52651e−02 D=−1.55538e−02 E=−8.21704e−02
R5 k=−4.56242e+00 B=6.65126e−02 C=7.16885e−03 D=−7.93434e−04 E=−3.1441 e−03
R6 k=−4.95466e+00 B=9.66847e−04 C=−9.06469e−04 D=3.63791e−04 E=−4.72104e−05

NUMERICAL EXAMPLE 25

| f = 4.300 | Fno = 4.00 | 2ω = 59.4° | |
|---|---|---|---|
| R1 = stop | D1 = 0.05 | | |
| R2 = 6.745 | D2 = 1.30 | N1 = 1.805720 | ν1 = 40. 9 |
| R3 = −1.557 | D3 = 0.35 | | |
| R4 = −0.724 | D4 = 0.90 | N2 = 1.833100 | ν2 = 24.1 |
| R5 = −2.296 | D5 = 0.10 | | |
| R6 = 2.200 | D6 = 1.30 | N3 = 1.509400 | ν3 = 56.0 |
| R7 = 10.000 | D7 = 0.93 | | |
| R8 = ∞ | D8 = 0.75 | N4 = 1.516330 | ν4 = 64.1 |
| R9 = ∞ | | | |

Aspheric Coefficients
R2 k=−1.49982e+01 B=−3.49031e02 C=−2.14757e−01 D=6.72734e−01 E=−9.87480e−01
R3 k=−7.58493e+00 B=−2.61653e−01 C=2.03186e−01 D=−1.25751e−01 E=−5.10303e−03
R4 k=−1.92001e+00 B=2.29470e−02 C=6.75599e−02 D=−2.08228e−02 E=−7.75786e−02
R5 k=−3.81335e+00 B=6.61276e−02 C=9.73351e−03 D=−1.69102e−03 E=−2.69172e−03
R6 k=−5.60220e+00 B=3.06205e−03 C=−6.71941e−04 D=5.13332e−04 E=−9.98966e−05

NUMERICAL EXAMPLE 26

| f = 4.300 | Fno = 4.00 | 2ω = 59.4° | |
|---|---|---|---|
| R1 = stop | D1 = 0.05 | | |
| R2 = 6.252 | D2 = 1.30 | N1 = 1.805720 | ν1 = 40.9 |
| R3 = −1.486 | D3 = 0.35 | | |
| R4 = −0.714 | D4 = 0.90 | N2 = 1.833100 | ν2 = 24.1 |
| R5 = −2.275 | D5 = 0.49 | | |
| R6 = 3.917 | D6 = 1.30 | N3 = 1.491710 | ν3 = 57.4 |
| R7 = −7.000 | D7 = 0.93 | | |
| R8 = ∞ | D8 = 0.75 | N4 = 1.516330 | ν4 = 64.1 |
| R9 = ∞ | | | |

Aspheric Coefficients

R2  k=−9.81192e+00  B=−3.02770e−02  C=−2.36586e−01
D=7.32674e−01  E=−1.12410e+00

R3  k=−6.97903e+00  B×−2.59737e−01  C=1.86002e−01
D=−1.17919e−01  E=−1.83674e−02

R4  k=−1.77687e+00  B=1.59528e−02  C=6.92437e−02
D=−4.15948e−02  E =−1.03912e−01

R5  k=−4.16035e+00  B=7.1318e−02  C=6.25595e−03
D=−2.58804e−03  E=−3.18734e−03

NUMERICAL EXAMPLE 27

| f = 4.300 | Fno = 4.00 | 2ω = 59.4° | |
|---|---|---|---|
| R1 = stop | D1 = 0.05 | | |
| R2 = 7.755 | D2 = 1.30 | N1 = 1.669100 | ν1 = 55.4 |
| R3 = −1.420 | D3 = 0.35 | | |
| R4 = −0.760 | D4 = 0.90 | N2 = 1.722500 | ν2 = 29.2 |
| R5 = −1.931 | D5 = 0.20 | | |
| R6 = 2.605 | D6 = 1.30 | N3 = 1.509400 | ν3 = 56.0 |
| R7 = 4.978 | D7 = 0.93 | | |
| R8 = ∞ | D8 = 0.75 | N4 = 1.516330 | ν4 = 64.1 |
| R9 = ∞ | | | |

Aspheric Coefficients

R2  k=−3.21627e+00  B=−3.87954e−02  C=−1.83637e−01
D=6.09322e−01  E=−8.88497e−01

R3  k=−6.61575e+00  B=−2.58858e−01  C=2.10120e−01
D=−5.70712e−02  E=−9.00498e−02

R4  k=−1.93699e+00  B=3.87934e−03  C=1.38557e−01
D=3.19179e−03  E=−1.68321e−01

R5  k=2.82581e+00  B=6.43070e−02  C=1.42997e−02
D=−4.13773e−04  E=−5.71966e−03

R6  k=−2.38012e+00  B=8.87515e−04  C=−2.49896e−03
D=1.53938e−03  E=−3.15477e−04

NUMERICAL EXAMPLE 28

| f = 4.300 | Fno = 4.00 | 2ω = 59.4° | |
|---|---|---|---|
| R1 = stop | D1 = 0.05 | | |
| R2 = 3.300 | D2 = 1.30 | N1 = 1.632460 | ν1 = 63.8 |
| R3 = −1.800 | D3 = 0.35 | | |
| R4 = −0.698 | D4 = 0.90 | N2 = 1.693200 | ν2 = 33.7 |
| R5 = −1.969 | D5 = 0.20 | | |
| R6 = 2.209 | D6 = 1.30 | N3 = 1.491710 | ν3 = 57.4 |
| R7 = 10.171 | D7 = 0.93 | | |
| R8 = ∞ | D8 = 0.75 | N4 = 1.516330 | ν4 = 64.1 |
| R9 = ∞ | | | |

Aspheric Coefficients

R2  k=1.36328e+00  B=−2.91573e−02  C=−9.06620e−02
D=3.22022e−01  E=−4.48135e−01

R3  k=−7.34566e+00  B=−2.15741e−01  C=1.41330e−01
D=−6.44475e−02  E=−5.39275e−02

R4  k=−1.86401e+00  B=−8.36802e−02  C=2.31629e−01
D=−1.24118e−01  E=−1.06237e−01

R5  k=−4.37845e+00  B=5.12446e−02  C=1.43519e−02
D=3.29615e−03  E=−5.41625e−03

R6  k=−3.48784e+00  B=3.68468e−03  C=−3.39763e−03
D=1.61815e−03  E=−2.44196e−04

TABLE 2

| Conditional Expression | Numerical Example | | | | |
|---|---|---|---|---|---|
| | 24 | 25 | 26 | 27 | 28 |
| (8) | 0.740 | 0.599 | 0.739 | 0.632 | 0.621 |
| (9) lower limit value | 1.7367 | 1.7367 | 1.7367 | 1.6704 | 1.6119 |
| (9) upper limit value | 1.9867 | 1.9867 | 1.9867 | 1.9204 | 1.8619 |
| (9) (10) N2 | 1.8331 | 1.8331 | 1.8331 | 1.7225 | 1.6932 |
| (11) | 0.433 | 0.399 | 0.393 | 0.595 | 0.511 |
| (12) lower limit value | 1.3220 | 1.3220 | 1.3038 | 1.3220 | 1.3038 |
| (12) upper limit value | 1.5720 | 1.5720 | 1.5538 | 1.5720 | 1.5538 |
| (12) (13) N3 | 1.5094 | 1.5094 | 1.4917 | 1.5094 | 1.4917 |
| (14) | 1.106 | 1.564 | 0.282 | 3.196 | 1.555 |
| (15) | 1.622 | 1.219 | 1.236 | 2.106 | 1.267 |
| (16) lower limit value | 1.7683 | 1.7683 | 1.7683 | 1.5798 | 1.4706 |
| (17) upper limit value | 2.0183 | 2.0183 | 2.0183 | 1.8298 | 1.7206 |
| (16) N1 | 1.8057 | 1.8057 | 1.8057 | 1.6691 | 1.6325 |
| (17) | −0.642 | −0.625 | −0.616 | −0.690 | −0.294 |
| (18) | 1.987 | 1.921 | 1.914 | 2.298 | 2.099 |

With a lens system of Embodiment 1 or 2, if the aperture diameter of the aperture stop SP is fixed, the aperture stop SP does not have to be provided as a separate member and the lens holding frame of the first lens L1 may be used instead.

One or more lenses which will not have much effect on the variation aberrations may also be added at the object side and/or the image plane side.

Additionally, a wide converter lens or a teleconverter lens, etc. may be positioned at the object side or the image plane side.

(Embodiment of an Image-taking Apparatus)

An embodiment of a digital still camera, which uses the present invention's lens system as the image-taking optical system, shall now be described using FIG. 58.

Figure 58:
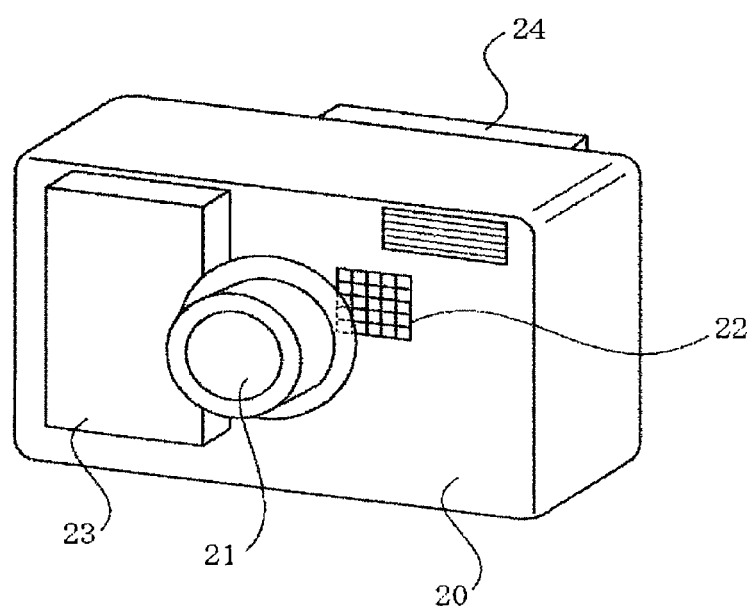
FIG. 58 is a schematic view of the principal parts of a digital still camera.

In FIG. 58, Reference Numeral 20 denotes a main camera body, Reference Numeral 21 denotes an image-taking optical system, constituted by the lens systems of any of Numerical Examples 1 to 23, Reference Numeral 22 denotes CCD sensor, CMOS sensor, or other solid-state image pickup element (photoelectric conversion element), which is built into the main camera body 20 and receives an object image which is formed by the image-taking optical system 21, Reference Numeral 23 denotes a memory, which records the information corresponding to the object image which has been photoelectrically converted by the solid-state image pickup element 22, and Reference Numeral 24 denotes a viewfinder, which is constituted by a liquid crystal display panel, etc. for observation of the object image formed on the solid-state image pickup element 22.

The present invention's lens system can thus be applied to a digital still camera or other optical apparatus to realize optical apparatus which is compact and is high in optical performance.

What is claimed is:

1. A lens system, comprising in order from an object side to an image side:
   a aperture stop;
   a first lens element which has a convex-shaped image side surface and a positive optical power; and
   a second lens element which has a concave-shaped object side surface and a negative optical power; wherein the following conditions are satisfied:

$1.0 < (R12+R11)/(R12-R11) < -0.1$ $1.0 < (R22+R21)/(R22-R21) < 3.0$ $-0.013\nu2+2.05 < N2 < -0.013\nu2+2.30$ $N2 > 1.65$ where R11 and R12 represent respective radii of curvature of an object side surface and the image side surface of the first lens element, R21 and R22 represent the respective radii of curvature of the object side surface and an image side of the second lens element, and N2 and ν2 represent a refractive index and an Abbe's number of the material forming the second lens element, respectively.

2. The lens system according to claim 1, wherein the following condition is satisfied:

$0.1 < |f2|/f < 0.8$ where f represents a focal length of the entire lens system, and f2 represents a focal length of the second lens element.

3. The lens system according to claim 1, further comprising:
   a third lens element which is positioned at the image side of the second lens element and has a positive optical power, and
   wherein the following condition is satisfied:

$0.5 < f3/f < 3.0$ where f represents a focal length of the entire lens system, and f3 represents a focal length of the third lens element.

4. The lens system according to claim 3, wherein at least one of the first lens element, second lens element, and third lens element is formed of a plastic material.

5. The lens system according to claim 1, wherein the following condition is satisfied:

$(n1+n2)/2 > 0.1$ where n1 represents a refractive index of the first lens element, and n2 represents a refractive index of the second lens element.

6. The lens system according to claim 1, wherein the following condition is satisfied:

$0.5 < d12/f < 3.0$ where f represents a focal length of the entire lens system, and d12 represents an interval between the first lens element and the second lens element.

7. The lens system according to claim 1, wherein the lens system forms an image on a photoelectric conversion element.

8. An image-taking apparatus comprising:
   a lens system according to claim 1; and
   a photoelectric conversion element which receives an image formed by the lens system.

9. A lens system, comprising in order from an object side to an image side:
   an aperture stop;
   a first lens element which has a positive optical power;
   a second lens element which has a negative optical power, the material forming the second lens element being glass; and
   a third lens element which has a positive optical power; wherein the following condition is satisfied:

$0.5 < fa/f < 0.9$ $-0.013\nu2+2.05 < N2 < -0.013\nu2+2.30$ $N2 > 1.65$ where fa represents a focal length of an air lens formed by an image side lens surface of the second lens element and an object side lens surface of the third lens element, f represents a focal length of the entire lens system, and N2 and ν2 represent a refractive index and an Abbe's number of the material forming the second lens element, respectively.

10. The lens system according to claim 9, the following condition is satisfied:

$0.1 < |f2|/f < 0.8$ where f2 represents a focal length of the second lens element.

11. The lens system according to claim 9, wherein the material which forms the first lens element is glass, and the following condition is satisfied:

$-0.013\nu1+2.30 < N1 - 0.013\nu1+2.55$ where N1 and ν1 represent a refractive index and an Abbe's number of the material forming the first lens element, respectively.

12. The lens system according to claim 9, wherein the material which forms the third lens element is a plastic material, and the following conditions are satisfied:

$-0.013\nu3+2.05 < N3 < -0.013\nu3+2.30$ $N3 < 1.65$ where N3 and ν3 represent a refractive index and an Abbe's number of the material forming the third lens element, respectively.

13. The lens system according to claim 9, wherein the following conditions are satisfied:

$-1.0 < (R12+R11)/(R12-R11) < -0.1$ $1.0 < (R22+R21)/(R22-R21) < 3.0$ where R11 and R12 represent respective radii of curvature of an object side surface and an image side surface of the first lens element, and R21 and R22 represent respective radii of curvature of an object side surface and the image side surface of the second lens element.

14. The lens system according to claim 9, wherein the lens system forms an image on a photoelectric conversion element.

15. An image-taking apparatus comprising:
    a lens system according to claim 9; and
    a photoelectric conversion element which receives an image formed by the lens system.

16. A lens system, comprising in order from an object side to an image side:
- an aperture stop;
- a first lens element which has a positive optical power;
- a second lens element which has a negative optical power; and
- a third lens element which has a positive optical power, the material forming the third lens element being a plastic material; wherein the following conditions are satisfied:

$$0.5 < fa/f < 0.9$$

$$-0.013\nu3+2.05 < N3 < -0.013\nu3+2.30$$

$$N3 < 1.65$$

Where fa represents a focal length of an air lens formed by an image side lens surface of the second lens element and an object side lens surface of the third lens element, f represents a focal length of the entire lens system, and N3 and ν3 represent a refractive index and an Abbe's number of the material forming the third lens element, respectively.

17. The lens system according to claim 16, wherein the following conditions are satisfied:

$$0 < (R32+R31)/(R32-R31) < 5.0$$

$$1.0 < f3/f < 3.0$$

where R31 and R32 represent respective radii of curvature of the object side surface and an image side surface of the third lens element, and f3 represents a focal length of the third lens element.

18. The lens system according to claim 16, wherein the following conditions are satisfied:

$$-1.0 < (R12+R11)/(R12-R11) < 0.1$$

$$1.0 < (R22+R21)/(R22-R21) < 3.0$$

where R11 and R12 represent respective radii of curvature of an object side surface and an image side surface of the first lens element, and R21 and R22 represent respective radii of curvature of an object side surface and the image side surface of the second lens element.

19. The lens system according to claim 16, wherein the lens system forms an image on a photoelectric conversion element.

20. An image-taking apparatus comprising:
- a lens system according to claim 16; and
- a photoelectric conversion element which receives an image formed by the lens system.

21. A lens system, comprising in order from an object side to an image side:
- an aperture stop;
- a first lens element which has a positive optical power;
- a second lens element which has a negative optical power; and
- a third lens element which has a positive optical power, the material forming the third lens element being a plastic material; wherein the following conditions are satisfied:

$$0.5 < fa/f < 0.9$$

$$-0.013\nu3+2.05 < N3 < -0.013\nu3+2.30$$

$$N3 < 1.65$$

$$-1.0 < (R12+R11)/(R12-R11) < 0.1$$

$$0 < (R32+R31)/(R32-R31) < 5.0$$

where fa represents a focal length of an air lens formed by an image side lens surface of the second lens element and an object side lens surface of the third lens element, f represents a focal length of the entire lens system, and N3 and ν3 represent a refractive index and an Abbe's number of the material forming the third lens element, respectively, R11 and R12 represent respective radii of curvature of an object side surface and the image side surface of the first lens element, and R31 and R32 represent the respective radii of curvature of the object side surface and an image side surface of the third lens element.

22. The lens system according to claim 21, wherein the lens system forms an image on a photoelectric conversion element.

23. An image-taking apparatus comprising:
- a lens system according to claim 21; and
- a photoelectric conversion element which receives an image formed by the lens system.

* * * * *